(12) United States Patent
Danilov et al.

(10) Patent No.: US 11,354,444 B2
(45) Date of Patent: Jun. 7, 2022

(54) ACCESS CONTROL FOR AN ORDERED EVENT STREAM STORAGE SYSTEM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 72 days.

(21) Appl. No.: 17/038,079

(22) Filed: Sep. 30, 2020

(65) Prior Publication Data

US 2022/0100876 A1  Mar. 31, 2022

(51) Int. Cl.
*G06F 21/62* (2013.01)
(52) U.S. Cl.
CPC .................... *G06F 21/629* (2013.01)
(58) Field of Classification Search
CPC .................................................. G06F 21/629
USPC .......................................................... 726/28
See application file for complete search history.

(56) References Cited

U.S. PATENT DOCUMENTS

| | | | |
|---|---|---|---|
| 3,617,587 A | 11/1971 | Nayar et al. | |
| 5,826,977 A | 10/1998 | Fowler et al. | |
| 8,572,091 B1 | 10/2013 | Sivasubramanian et al. | |
| 8,655,825 B2 | 2/2014 | Roesch et al. | |
| 8,825,848 B1 | 9/2014 | Dotan et al. | |
| 9,514,018 B2 | 12/2016 | Sikri | |
| 9,639,589 B1 | 5/2017 | Theimer | |
| 9,753,932 B1 | 9/2017 | Brow et al. | |
| 9,898,482 B1 | 2/2018 | Bono | |
| 9,965,215 B1 | 5/2018 | Vazhenin et al. | |

(Continued)

FOREIGN PATENT DOCUMENTS

| CA | 2672879 A1 * | 4/2008 | ......... G07C 9/00007 |
|---|---|---|---|
| CN | 1708029 A * | 12/2005 | |

(Continued)

OTHER PUBLICATIONS

Azhar et al., "Efficient selection of access control systems through multi criteria analytical hierarchy process", IEEE, doi: 10.1109/ICET.2012.6375419, 2012, pp. 1-8. (Year: 2012).*

(Continued)

*Primary Examiner* — Peter C Shaw
(74) *Attorney, Agent, or Firm* — Amin, Turocy & Watson, LLP

(57) ABSTRACT

Access control for an ordered event stream (OES) storage system is disclosed. Access to a portion of an OES can be controlled at a key-level in relation to a key space of the OES. An application instance can be identified to enable determining a correspondence to one or more keys. The correspondence can be embodied in stored data, for example, via an advanced access control list (AACL) that can be in the form of a list, a table, etc. Application instance access to the portion of the OES can be controlled by determining if an access rule is satisfied, e.g., determining if the key space the application instance wants to access comports with the one or more keys corresponding to the application instance identity. In an aspect, screening data corresponding to the AACL can enable preliminary access screening external to the OES storage system.

20 Claims, 10 Drawing Sheets

(56) References Cited

U.S. PATENT DOCUMENTS

| | | | |
|---|---|---|---|
| 10,565,208 B2 | 2/2020 | Triou, Jr. et al. | |
| 10,860,457 B1* | 12/2020 | Evenson | G06F 17/40 |
| 10,867,033 B2 | 12/2020 | Keren et al. | |
| 11,016,826 B2 | 5/2021 | Lehmann | |
| 11,194,638 B1 | 12/2021 | Danilov et al. | |
| 2004/0199524 A1 | 10/2004 | Rys et al. | |
| 2005/0055519 A1 | 3/2005 | Stuart et al. | |
| 2007/0220518 A1 | 9/2007 | Verbowski et al. | |
| 2008/0184262 A1 | 7/2008 | Ginis et al. | |
| 2008/0301135 A1 | 12/2008 | Alves et al. | |
| 2009/0182784 A1 | 7/2009 | Rohit et al. | |
| 2010/0083098 A1 | 4/2010 | Leme et al. | |
| 2010/0125794 A1 | 5/2010 | Hampton et al. | |
| 2011/0126099 A1* | 5/2011 | Anderson | H04L 63/0807 715/751 |
| 2011/0131588 A1 | 6/2011 | Allam et al. | |
| 2011/0249147 A1 | 10/2011 | Ishii | |
| 2012/0102503 A1 | 4/2012 | Meijer et al. | |
| 2012/0109985 A1 | 5/2012 | Chandrasekaran | |
| 2013/0226931 A1 | 8/2013 | Hazel et al. | |
| 2013/0275808 A1 | 10/2013 | McNeeney et al. | |
| 2014/0089264 A1 | 3/2014 | Talagala et al. | |
| 2014/0223115 A1 | 8/2014 | Dinkjian et al. | |
| 2015/0169449 A1 | 6/2015 | Barrell et al. | |
| 2015/0172120 A1 | 6/2015 | Dwarampudi et al. | |
| 2015/0341212 A1 | 11/2015 | Hsiao et al. | |
| 2015/0363245 A1 | 12/2015 | Mutschler | |
| 2016/0063080 A1* | 3/2016 | Nano | G06F 16/254 707/602 |
| 2016/0210061 A1 | 7/2016 | Soncodi et al. | |
| 2016/0321287 A1 | 11/2016 | Luthra et al. | |
| 2016/0337435 A1 | 11/2016 | Nigam et al. | |
| 2016/0357476 A1 | 12/2016 | Chen et al. | |
| 2017/0075832 A1 | 3/2017 | Bhimani et al. | |
| 2017/0075947 A1 | 3/2017 | Kurilov et al. | |
| 2017/0177263 A1 | 6/2017 | Das et al. | |
| 2017/0212891 A1 | 7/2017 | Pundir et al. | |
| 2018/0101842 A1 | 4/2018 | Ventura et al. | |
| 2018/0121307 A1 | 5/2018 | Braun et al. | |
| 2018/0176244 A1* | 6/2018 | Gervais | G06F 21/604 |
| 2018/0184138 A1 | 6/2018 | Shaw et al. | |
| 2018/0329644 A1 | 11/2018 | Das et al. | |
| 2018/0332325 A1 | 11/2018 | Kaitchuck | |
| 2018/0332365 A1 | 11/2018 | Kaitchuck et al. | |
| 2018/0332366 A1 | 11/2018 | Paduroiu | |
| 2018/0332367 A1 | 11/2018 | Kaitchuck et al. | |
| 2018/0336256 A1 | 11/2018 | Li et al. | |
| 2018/0345140 A1 | 12/2018 | Posin | |
| 2019/0026301 A1 | 1/2019 | Wang et al. | |
| 2019/0138494 A1 | 5/2019 | Inoue | |
| 2019/0340180 A1 | 11/2019 | Barsness et al. | |
| 2019/0349422 A1 | 11/2019 | Dhruvakumar et al. | |
| 2020/0034468 A1 | 1/2020 | Lei et al. | |
| 2020/0174695 A1 | 6/2020 | Bazarsky et al. | |
| 2020/0250172 A1 | 8/2020 | Busjaeger et al. | |
| 2020/0320005 A1 | 10/2020 | Shulman et al. | |
| 2020/0344299 A1 | 10/2020 | Sohail et al. | |
| 2020/0394196 A1* | 12/2020 | Shivanna | G06F 16/2322 |
| 2020/0404011 A1* | 12/2020 | Gervais | H04L 63/20 |
| 2021/0110328 A1 | 4/2021 | Hsiao et al. | |
| 2021/0124746 A1 | 4/2021 | Klaedtke | |
| 2021/0256029 A1 | 8/2021 | Danilov et al. | |
| 2021/0342296 A1 | 11/2021 | Danilov et al. | |
| 2021/0342354 A1 | 11/2021 | Danilov et al. | |
| 2021/0365211 A1 | 11/2021 | Danilov et al. | |
| 2022/0035533 A1 | 2/2022 | Danilov et al. | |

FOREIGN PATENT DOCUMENTS

| | | | | |
|---|---|---|---|---|
| CN | 104901958 A | * | 9/2015 | |
| CN | 105591926 A | * | 5/2016 | H04L 45/745 |
| GB | 2377038 A | * | 12/2002 | G06F 17/10 |
| WO | 2002101585 | | 12/2002 | |
| WO | 2009014993 | | 1/2009 | |
| WO | 2015191120 | | 12/2015 | |
| WO | 2018148149 | | 8/2018 | |

OTHER PUBLICATIONS

Rox et al., "Construction and Deconstruction of Hierarchical Event Streams with Multiple Hierarchical Layers", IEEE, doi: 10.1109/ECRTS.2008.13, 2008, pp. 201-210. (Year: 2008).*

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Office Action dated Oct. 1, 2021 for U.S. Appl. No. 16/915,762, 57 pages.

Office Action dated Oct. 1, 2021 for U.S. Appl. No. 17/127,724, 41 pages.

Office Action dated Nov. 10, 2021 for U.S. Appl. No. 16/944,089, 75 pages.

Kleppmann, Martin. "Making Sense of Stream Processing—The Philosophy Behind Apache Kafka and Scalable Stream Data Platforms"; Mar. 4, 2016; retrieved from [https://hashingit.com/elements/

(56) References Cited

OTHER PUBLICATIONS research-resources/2016-03-04-making-sense-of-stream-processing. pdf] on Nov. 5, 2021, (Year 2016), 183 pages.

Notice of Allowance dated Dec. 15, 2021 for U.S. Appl. No. 17/064,747, 54 pages.

Office Action dated Jan. 21, 2022 for U.S. Appl. No. 16/864,892, 26 pages.

Notice of Allowance dated Feb. 4, 2022 for U.S. Appl. No. 16/915,762, 57 pages.

Office Action dated Apr. 12, 2022 for U.S. Appl. No. 17/038,102, 48 pages.

Office Action dated Apr. 20, 2022 for U.S. Appl. No. 16/944,094, 48 pages.

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).

Notice of Allowance dated Feb. 18, 2022 for U.S. Appl. No. 17/083,145, 70pgs.

Office Action dated Mar. 21, 2022 for U.S. Appl. No. 16/864,905, 125 pgs.

Edi Muskardin et al.," Implementation of Hashing Algorithms in Stream Mining", International Conference on Smart Systems and Technologies (SST), Oct. 2018 , pp. 233-238.

Notice of Allowance dated Apr. 11, 2022 for U.S. Appl. No. 16/944,089, 87 pages.

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).

\* cited by examiner

ACCESS CONTROL FOR AN ORDERED EVENT STREAM STORAGE SYSTEM

TECHNICAL FIELD

The disclosed subject matter relates to data storage and, more particularly, to controlling access to an ordered event stream (OES) of an ordered event stream storage system.

BACKGROUND

Conventional data storage techniques can employ an event stream, e.g., storing data corresponding to stream events in a logical order. In a conventional system, an event stream can provide for storing a generally unbounded stream of events whereby a portion of the stored events can then be read out in the order in which they were stored. One use of data storage is in bulk data storage. Typically, access to a stream by an application can be specified, e.g., a system administrator can specify what application can access which stream(s). However, as use of OESs becomes more ubiquitous, access control that improves over the basic conventional access control functionality can be desirable.

DETAILED DESCRIPTION

Figure 1:
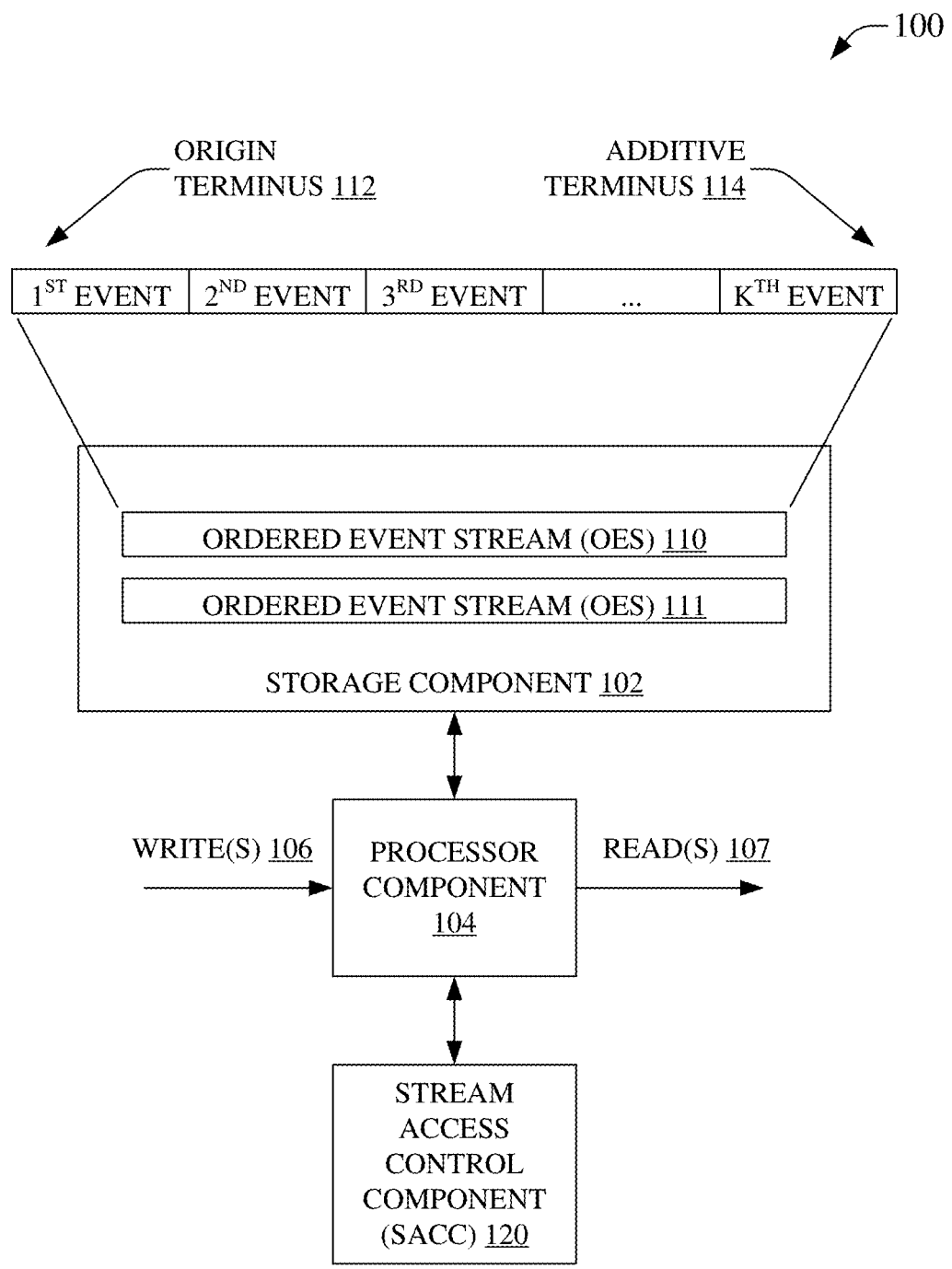
FIG. 1 is an illustration of an example system that can facilitate access control for an ordered event stream, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without one or more of the illustrated specific details. In other instances, well-known structures and devices are shown in block diagram form in order to facilitate describing the subject disclosure.

As mentioned, conventional event stream storage techniques can employ rudimentary access controls. As an example, an administrator can specify that an application has permission to access an event stream, e.g., the application can be permitted to read from the specified stream, write to the specified stream, etc. This conventional access control is appreciably rudimentary. However, as stream storage systems evolve, improved access control can be desirable, as is disclosed hereinafter. As an example of possible difficulty with conventional access control, where a large number of instances of a same application can be deployed, and because the application can be granted access to a stream via a rudimentary access control element of a conventional stream storage system, then all of the large number of instances can have access because they are all instances of the same application. In this example, if one of the instances begins writing excessively large numbers of events, effective control of this runaway condition can be difficult to manage in a conventional system. This can illustrate that application instances can become increasingly difficult to manage as they increase in number, similar issues can arise where instances become more spatially distributed, adopt new localizations, etc., such that improving access control can be important to keeping a storage system performing well. Application instances can malfunction, become compromised or corrupted, become infected with a virus, worm, etc., or simply be used improperly, either knowingly or unknowingly. As an example, an instance of an application on a sensor can write to a stream based on a user set parameter, where a user mistakenly enters the parameter with a misplaced decimal point in the value, orders of magnitude more write events may occur to the event stream. This error causing excessive event writes can be managed via advanced access control techniques. As such, advanced access control is presently disclosed herein below.

An OES, or a stream for convenience, can be a durable, elastic, append-only, unbounded sequence of events. An example of an ordered event streaming storage system can be STREAMING DATA PLATFORM by DELL EMC. An event can be added to a head of a stream of events, e.g., a first event can be considered at a tail of an event stream and a most recent event can be regarded as being at the head of the stream with other events ordered between the tail and the head of the stream. It is noted that some stream systems, e.g., PRAVEGA by DELL EMC, etc., can employ an inverted head/tail terminology, for example, in PRAVEGA a first event can be added at a head of an OES, while subsequent new events can then be added to a tail of the OES, however, this is indistinguishable in all other aspects from the head/tail convention generally employed in the instant disclosure. Every event of the stream can be associated with a routing key, or simply key for convenience. A key can often be derived from data of the event, e.g., a "machine-id," "location," "device type," "customer number," "vehicle identifier," etc. In an aspect, an event can be associated with a key, however, data yet to be written to an event can be associated with a access target value that can be the same value as the key, e.g., the access target value can be determined based on the data of the event, a characteristic corresponding to the event to be recorded, etc., such that the access target value can be regarded to be the same as the key. Accordingly, the term event key, hashed key value, access target value, key, etc., can be used interchangeably for convenience unless the context indicates a more specific use, for example, a access target value can correspond to data to be stored in an event and can be derived from that data or other characteristics corresponding to the data such that when the event is stored the access target value can be used as the key associated with storing the event. Similarly, in a read operation, an access target value can be indicated to allow access to an event having a key that matches the access target value because the event was written to the OES according to a key that can be the same as the access target value. Generally speaking, the term access target value can relate to a "key's" value such that access to events of an OES can be based on comparing the access target value to key values for actual stored events, where an existing event is to be read, or key values that will be used to store an event, where an event will be written into the OES at the access target value. Again, it is generally easier to just use the term key for both access target value and routing key unless more specificity is needed in some given example, and this convention is generally used in the instant disclosure for clarity and brevity. Events with the same routing key can be written to a corresponding stream or stream segment, and can also be consumed, e.g., read, in the order they were written to the stream or stream segment.

In an aspect, OES can comprise one or more stream segments. A segment of an event stream can generally be associated with a single processing instance to assure ordering of the events stored in the segment. A processing instance can be a single real physical processor, a virtualized processor executing on one or more real physical processors, a group of real physical processors, a group pf virtual processors executing on one or more real physical processors, etc. As an example, a processing instance can be a blade server of a rack system. As another example, a processing instance can be a virtual processor deployed in an elastic computing system, e.g., a 'cloud server,' etc. Typically the processing instance can be associated with a level of performance which, in some embodiments, can be measured via one or more key performance indicators (KPIs) for the processing instance. As an example, a first blade server of a rack can have a first level of performance and a second blade server of a rack can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed per unit time by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support or management costs, real estate for deployment costs, etc. As such, selecting an appropriate processing instance can be associated with optimizing cost(s). As an example, if an event stream consumes less than one unit of work, then pairing the stream with a processing instance that can perform one unit of work can be a more optimal use of computing resources, e.g., lower overall aggregate costs, etc., than pairing the even stream with a processing instance that can perform 200 units of work which can result in 'wasting' up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a race car of a performance instance can be understood as possibly not being an optimal pairing in comparison to a more pedestrian performance instance.

Where an OES can be comprised of one or more portions, e.g., segments, shards, partitions, pieces, etc., that can generally be referred to as stream segments, or simply segments for convenience, a segment of an OES can act as a logical container for one or more events within the OES. When a new event is written to a stream, it can be stored to a segment of the stream based on a corresponding event routing key. An event routing key can be hashed with other event routing keys to form a "key space". The key space can be employed to 'divide' the stream into a number of parts, e.g., segments. In some embodiments, consistent key hashing can be employed to assign events to appropriate segments. As an example, where a stream comprises only one segment, all events to be written to the stream are written to the same segment in an ordered manner and the segment corresponds to the entire key space. As another example, where a stream comprises two segments, the key space can be associated with the two segments, e.g., the total key space can extend from zero to 'n', however each of the two segments can be associated with a portion of the total key space, for example, the first segment can be employed to store events with a key between zero and 'n' and the second segment can be employed to store events with a key between 'm+1' and 'n'. It will be appreciated that more segments can be employed to further divide the key space such that a segment can store an event with a key falling within the range of the key space associated with that segment. As an example, a four segment OES can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0, etc. Other example divisions of the key space in this example, such as asymmetric division of the key space, etc., are readily appreciated and are not further recited for the sake of clarity and brevity.

Moreover, an OES stream can have a topology that evolves. An evolution of an OES topology can be related to different epochs. As an example, an OES can initially have a first segment, but where writing of events increases above a threshold level, the OES can be scaled to comprise two segments, e.g., a second segment and a third segment. In an aspect, each of the second and third segments can employ a separate processor instance to write events, e.g., scaling the OES can correspond to an increase in the count of processors writing events to the OES. Accordingly, a hashed key space can be divided to encompass the second and third segments of the scaled OES, e.g., the example OES can initially have the first segment covering a key space of 0 to 1, and after the scaling, the second segment can cover events from zero up to 0.25 of the key space and the third segment can cover events from 0.25 to 1 of the key space. The example scaling of the OES can constitute an 'epoch change', e.g., evolution of the topology of the OES, such that before the scaling the OES had the first segment in a first epoch, e.g., 'Epoch 1', and, after the scaling, the OES can have a second and third segment in a second epoch, e.g., 'Epoch 2'. In an aspect, the first segment can be closed at the change in epoch, and thereby, the second and third segments can correspondingly be opened at the epoch change. In this way, in Epoch 1 there is one segment for all of the key space zero to one and, in Epoch 2, there are two segments, each covering a portion of the total key space. In an aspect, storage schemes can be different in different epochs, e.g., the topology change of the OES can result in a change in storage scheme. Returning to the above example, reading an event with a key space value of 0.75 in the first epoch can read from the first segment and can be distinct from reading another event with a key space value of 0.75 in the second epoch that would read from the third segment. The use of different storage schemes for events of an OES, e.g., an OES having different OES segment schemes across epochs of an OES, can be associated with reading out OES events according to those different storage schemes in their corresponding epochs.

An OES storage scheme can correspond to a distribution of a hashed key space to segments of an OES. As an example, a first OES storage scheme can have a hashed key space extends from 0 to 1, wherein a first segment can store events having a hashed key value 'y' between 0 and 0.28, e.g., $0 \leq y < 0.28$, and a second segment of the OES can store events having 'y' between 0.28 and 1, e.g., $0.28 \leq y < 1$. The example first OES storage scheme can be altered to a next storage scheme, e.g., advanced to a second epoch, wherein the first and second segment can be closed and a third and fourth segment can be opened wherein third segment can store events having a hashed key value 'y' between 0 and 0.7, e.g., $0 \leq y < 0.7$, and the fourth segment of the OES can store events having 'y' between 0.7 and 1, e.g., $0.7 \leq y < 1$. Moreover, the second epoch can end when a third epoch is begun that represents a third OES storage scheme, for example, closing the third and fourth segments and opening fifth through seventh segments, wherein the fifth segment can store events having a hashed key value 'y' between 0 and 0.1, e.g., $0 \leq y < 0.1$, the sixth segment can store can store events having 'y' between 0.1 and 0.5, e.g., e.g., $0.1 \leq y < 0.5$, and the seventh segment can store can store events having 'y' between 0.5 and 1, e.g., $0.5 \leq y < 1$.

Generally, changes to an OES storage scheme, e.g., an epoch change, etc., can be in response to an indication that computing resources transition a level of burden, e.g., where a processor becomes burdened, another processor can be added and the key space can be divided between increased number of processors according to a new epoch. An event stream can be bifurcated, symmetrically or asymmetrically, to increase an amount of computing resources available to each segment of an OES. As an example, if an initial event stream causes a load of two units of work for a first processor, and the two units of work load correspond to an even distribution of work across the associated key space of the initial event stream, and the two units of work can exceed a threshold work level of the example first processor, then the stream can be split into two segments and a second processor can be added. In this example, after the scaling of the stream, the first processor can now support a second segment, in lieu of the initial one segment, at about one unit of work and a third segment can be supported by the second processor, also at about one unit of work, assuming the work load from the initial stream was roughly evenly split between the key spaces of the new epoch.

Transitions between OES epochs, e.g., changing OES storage schemes can be related to changing write and read demands associated with a stream of data. As an example, writing ride share service events to an OES can be according to OES segments that can divide the hashed key space into regions, e.g., a west region, a central region, and an east region. In this example, as peak demand for ride share services can be associated with the time zones, for example being busier in the east zone at local 5 pm than in the west zone that would be at a local time of 2 pm. A such, there can be more demand, in this example, to write data to the OES segment corresponding to the east region and the storage scheme can meet this demand by scaling the OES segment to allow more east region data to be written, e.g., splitting the example OES segment to more segments to allow engaging more processors, which, in some embodiments, can increase the hashed key space related to the now plural OES segments for east region event writing. Moreover, as time continues, demand can increase in the west region and wane in the east region, for example 5 pm in the west can be 8 pm in the east. As such, the east region segments can be scaled down and the west region segments can be scaled up, e.g., effectively shifting processing power to storage of west region events rather than east region events. The change in scaling of the segments of the OES can be associated with a change in storage scheme and a change in OES storage epochs, etc.

Poor access control can lead to scaling, inefficient use of computing resources, storage system downtime, etc. Given that accessing a stream to read, write, etc., an event consumes computing resources, a ill behaving application instance can increase the numbers of OES access events, can attempt access to areas of an OES that are not associated with the application instance, etc. As an example, an application instance can suffer a glitch that can increase the frequency of event writes to an excessive level. In this example, there can be so many write attempts that the OES can try to scale to accommodate, can become bogged down, can crash, etc. In another example, an application can attempt to read events from a segment that it does not have permission to read from, for example where an epoch change has occurred and the application instance is improperly reports the epoch it is attempting to read from, etc. In this example, incorrect data could be returned, read-once rules can be incorrectly satisfied and can result in data becoming less accessible, etc. It can be appreciated that improved access control can alleviate some of the issues associated with conventional rudimentary access control.

In an aspect, a routing key can be treated as a logical resource that can enable access control at the level of the routing key. This can increase system stability, security, etc., and can also allow an OES storage system to be highly flexible. In an embodiment, an advanced access control list (AACL) can be used to indicate access for an application instance at a key level. As an example, an AACL can indicate individual routing keys, lists of routing keys, routing key ranges, such as via use of a wildcard value in a routing key value, or combinations thereof. As such, the AACL can specify, for example, that a certain writer, e.g., an application instance, can create new events within a stream only with the routing key reserved for this particular writer, e.g., $global_writer_name, etc. Accordingly, in this example, the writer application can get an error when trying to create an event with a different routing key. This can help to limit propagation of failures caused by a hardware/software issue, a malicious software, improper input parameters, etc. In this example, where the example writer instance is improperly updated to write events to a different routing key, an error can result from checking writes against the AACL for the example writer. In response to the errors, the writer instance can be updated to correct the issue, the writer instance can write to a sandboxed area of memory until the issue is corrected, the writer instance can be prevented from writing to the stream, or nearly any other action responsive to the example writer instance attempting to write to a key that does not comport with the AACL for the writer instance can be undertaken.

In some embodiments, a writer can receive AACL information allowing it to self-verify before attempting to perform stream operations. This can allow offloading some aspects of access control from the OES storage system to an application instance that can attempt to interact with the OES storage system. As an example, an instance of a writer can deploy and an OES storage system component, for example stream access control component (SACC) 120, etc., can provide the writer instance with AACL information. The example writer instance can then check to see that events it attempts to write to an OES segment comport with the AACL information, e.g., the application instance can perform some access control check before sending writes to the OES storage system. Obviously, where the writes don't comport with the AACL information, a need for corrective action can be indicated by the example writer instance. Further, writes that are sent from the example writer instance to the OES storage system can also be checked by the OES storage system against a corresponding AACL. As such, where the AACL information used by the example writer instance is out of date, corrupted, infected, etc., allowing the writer instance to send the write to the OES storage system, the OES storage system can still perform an AACL check itself as an additional layer of access control verification.

Moreover, such as where an OES storage system supports transactions, the OES storage system can perform access control operations at event write time, and again at transactional event commit time. In an aspect, multiple events can be part of a transaction where all events are committed or are not committed as a group, e.g., the transaction is committed in whole or not at all. As an example, a transaction for production of a widget can comprise a first injection molding success event, an assembly completed event, and a quality control passed event, wherein the example events can be written to the OES at different times but may not be committed as a transaction unless all of the events are committed. In this example, failing a quality control, for example, can result in the transaction not being committed and therefore none of the event for production of this particular widget may be committed to the OES. Accordingly, a sensor for the blow molding process can self-check against provided AACL information for that sensor before sending a write to the OES. Similarly, writer instances associated with the assembly and quality control events can also self-check before sending a write to the OES. The OES can then check the incoming writes before allowing them to be written into a storage location of the OES storage system. Moreover, the OES can again check the events against the AACL before committing the events where the transaction is to be committed to the OES. There is some probability that an AACL has changed during transaction lifetime, e.g., between writing an event and committing the event as part of a committing a transaction. All the events within a transaction still must have an all-or-nothing effect, that is, either the transaction succeeds, and all the events go to the stream, or otherwise, the stream does not include any of the events of the transaction. As such, failure of an event of the transaction due to failed access can result in failure of the transaction. In an aspect, corrective action can be undertaken in some embodiments to avoid loss of the transaction, e.g., updating the AACL, updating a routing key of an event of the transaction, etc.

Similar to writer instances, other application instances can also employ advanced access control. As an example, reader application instances can be subject to access control restrictions. In an aspect, an AACL can be used to restrict read access to stream data, e.g., for security, filtering of reads, etc. In an embodiment, routing key information can be affiliated with events to enable prompt access control checks. In some embodiments, an AACL can be associated with one reader instance, while in some embodiments the AACL can be for reader instances of a reader group. In a reader group, each reader instance can be understood to inherit the reader group's AACL(s). As an example, where a reader group comprises a first instance of a first reader application, a second instance of a second reader application, and a third instance of the second reader application, then assigning an AACL to the reader group can identify which routing key(s), groups of keys, etc., the three instances can read from in one or more epochs of one or more OES s. Furthermore, adding a reader instance to the reader group can result in an added reader instance inheriting the AACL of the reader group. Correspondingly, the AACL for the reader group can be updated, e.g., when adding or removing a reader instance to the reader group, periodic AACL updates, etc.

Use of advanced access control at the routing key level can provide for an efficient build of a complex OESs. As an example, while it can be a common practice to store results of stream data processing to another stream, cross stream synchronization can be a difficult and it can be preferable to keep all data in just one stream. The use of advanced access control, as disclosed herein, can facilitate building a single stream solution to avoid cross stream synchronization, etc. In an example system, raw data from sensors can be handled by preprocessing and then subsequent processing, e.g., in two steps. AACLs can be configured for all the sensors such that all events with raw data can be created with routing keys that, for example, start with a "raw_" prefix. A preprocessor can be allowed to read raw data only and to then create new events with routing keys, for example, that can start with a "preproc_" prefix. It can be readily appreciated how the use of advanced access control disclosed herein can enable writing of raw events and subsequent reading of the raw events as part of generating preprocessed events. The two example conditions can be readily enforced using two AACLs for the preprocessor, one for read operations and one for write operations. Similarly, the processor can then read preprocessed data only and can create events with routing keys that can start with a "proc_" prefix. Again, these two conditions also can be easily enforced using two AACLs for the processor. Accordingly, the OES can comprise raw events from sensors, preprocessed events based on the raw events, and processed events based on the preprocessed events by corresponding filtering of read operations and hashing of the routing key having an appropriate prefix. It is to be understood that "raw," "preproc," "proc," etc., are merely verbose representations of a portion of an example hashed key and any value corresponding to a 'type' of the event, 'source' of the event, 'condition' of the event, etc., can be designated in the routing key. As an example, a routing key beginning with '111 . . . ' can indicate 'raw' while a beginning of '101 . . . ' can indicate 'preproc' and a '100 . . . ' can indicate processed, etc. As a further example, a portion of the routing key indicating, for example, 1xe6' can be associated with a sensor that wrote the data being located in Australia. Similarly a portion of the routing key, for example, indicating 'ts' can indicate that an event can only be read by a reader indicating 'top secret or better' security clearance.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate access control for an ordered event stream, in accordance with aspects of the subject disclosure. System 100 can comprise a storage component 102 that can store an ordered event stream (OES), such as OES 110, OES 111, etc. An OES can store one or more events. An event can be associated with a key, e.g., a routing key. A key can typically be determined from aspects or characteristics of, or corresponding to, an event, although other key determination techniques can be employed. As an example, a key can be based on a characteristic of the source of the event data, such as a customer identifier, machine identifier, a location of a device providing the event data, a type of a device providing the event data, etc. Events can be written into and OES in an ordered manner according to a key, e.g., events with a same key can be written to a same portion, e.g., segment, etc., of an OES in an ordered manner. Similarly, events can be read from an OES, generally in an ordered manner, according to a key, e.g., generally in the order they were previously written into a portion of an OES. Components providing data for events to be written can be termed 'writers' and components requesting data from events can be termed 'readers'. As such, a writer can provide data for an event that can be written to a portion of an OES, e.g., OES 110, 111, etc., in an ordered manner based on a key associated with the event. Similarly, a reader can receive data from an event stored in a portion of an OES, e.g., OES 110, 111, etc., based on a key.

Processor component 104 of a system 100 can receive write(s) 106 that can be written to OES 110, 111, etc., to be stored via storage component 102. Processor component 104 of a system 100 can provide access to events based on a key, e.g., as read(s) 107 that can be communicated to a reader. Generally, one processing instance, e.g., processor component 104, etc., can be designated for writing events to a portion, e.g., segment, of OES 110, 111, etc. OES 110, 111, etc., can comprise one segment and/or parallel segments, e.g., stream segments, etc., see, for example, illustration 211 in FIG. 2, etc., that can store events according to a key. In an aspect, more than one processing instance writing to a segment of an OES, while allowable in some embodiments, is typically disfavored because it can increase the difficulty of writing incoming events in an ordered manner. However, a given processing instance can read, write, etc., to more than one OES segment, e.g., a given processing instance can write to one or more OESs, to one or more segments of one OES, to one or more segments of one or more OESs, etc. Generally, for a given number of segments there can typically be up to the same number of processing instances. Although adding more processing instances is allowable, these additional processing instances are generally idle to avoid possible scrambling of an order of events being written to a segment. It is further noted that system 100 can comprise idle processing instances, for example, as reserve processing instances for failover where an active processing instance becomes less responsive, etc. In an aspect, keys of one or more segments of an OES can represent a key space for OES 110, 111, etc., see 211 in FIG. 2, etc., for example. Segments can therefore act as logical containers associated with a particular range of keys for an event stream and can be used to store events within an OES. When a new event is written to a stream, it can be stored to one of the segments based on the event key. In an aspect, the key space can be divided into a number of ranges that can correspond to the number of segments comprising an OES. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the first segment after the second event, etc.

OES 110, as illustrated in system 100, can be a simplistic example of an OES that can comprise just one segment for storing incoming event write(s) 106 and sourcing event read(s) 107, and therefore the key space of OES 110 can be embodied in an example single segment of events that can have an origin terminus 112. A first event can be written at origin terminus 112. Subsequent events can then be appended at an additive terminus 114 that is typically always at the head of the stream of written ordered events, e.g., a most recent event is written to the head of example OES 110, which can provide ordering of the events being written. This can result in example OES 110 allowing for continuous and unbounded data storage that can be a durable, elastic, append-only, unbounded sequence of events. As an example, a $(K+1)^{th}$ event can be appended to the $K^{th}$ event of example OES 110 at additive terminus 114. In an aspect, storage component 102 can store any number of OESs, e.g., OES 110, 111, etc. Moreover, any one OES can comprise any number of parallel segments, e.g., stings of events for a defined key space range. Each segment can comprise an ordered sequence of stored events. The key space of an OES can evolve, e.g., through different epochs, to comprise different numbers of OES segments as is disclosed elsewhere herein. The key space can be symmetrically or asymmetrically divided and can be, but is not required to be, contiguous.

In system 100, stream access control component (SACC) 120 can facilitate control of access to portions of an OES. Access control can facilitate or limit access to a portion of an OES in relation to an application instance performing an operation(s) relative to the portion of the OES, e.g., reading an event from the portion of the OES, writing an event to the portion of the OES, facilitating commission of a transaction to the portion of the OES, etc. In an aspect, an application instance, e.g., a reader, a group of readers, a writer, etc., can indicate, via processor component 104, an identifier of the application instance and SACC 120 can determine if a portion of an OES can be made accessible based on a key, e.g., access can be predicated on a hashed key being determined to satisfy an access rule related to a segment of an OES based on the particular application instance seeking access to the segment. In an embodiment, SACC 120 can determine one or more keys that a particular application instance can be permitted to access, e.g., a key in a segment, group(s) of key(s), range(s) of key(s), etc. In some embodiments, access can further be based on the type of operation to be performed, e.g., a reader instance can be limited to a key(s) as well as can be limited to reading only certain types of events, for example a 'raw_' event, 'preproc_' event, etc., as illustrated in other examples disclosed elsewhere herein. In a similar example, a writer instance can be limited to writing a particular type of event, e.g., a 'proc_' event, etc., within a specified range of keys, etc.

In embodiments, system 100 can facilitate offloading some access control by communicating, via SACC 120, key(s) to an application instance(s). The application instance(s) can then determine if access is appropriate based on the portion of the OES the application instance is instructed to attempt to access. As an example, a writer can send an event to processor component 104, whereby the identity of the writer instance can be determined and SACC 120 can determine if access to a portion of an OES is permissible based on the determining what segment of the OES the event is trying to be written to and what key(s) the identified writer instance is permitted to access. This example illustrates that system 100 can be burdened with checking access of every intended example write operation. In order to lessen the burden, the example can further include offloading of an initial access control operation. As such, expanding on the above example, the writer instance can identify itself to processor component 104 and SACC 120 can return key(s) the identified writer instance can access. The example writer instance can then check to see if the event it has been instructed to attempt to write satisfies an access rule based on the key(s) provided by SACC 120. Where the event key does not satisfy the access rule based on the SACC 120 provided keys, the writer instance can terminate attempting to write the event prior to sending it to system 100, e.g., the writer instance can use SACC 120 provided access information, e.g., keys, etc., to determine if an event is appropriate to attempt to write to system 100. This can reduce the count of errant write attempts that can be processed by system 100. Moreover, system 100 can still determine access in addition to the writer instance preliminary access screening operation, e.g., even where the writer instance sends an event to be written, system 100 can still determine if that access is allowed. It can be appreciated that were the example writer event can be compromised, infected, malicious, errant, etc., and can attempt writes where access should not have been allowed, system 100 can still self-check access to thwart the attempt. Similar access validation, preliminary access screening, or combinations thereof can be performed by other application instances, e.g., readers, etc. It is noted that readers and/or writers are not expressly illustrated in system 100 because they generally fall outside the scope of the OES storage system, e.g., they can interact with system 100 but they are generally comprised in devices, systems, etc., external to system 100. Much as a cell phone is typically not considered part of a cellular network, but rather a device that can interact with a cellular network, a writer, reader, etc., can interact with OES storage system 100 without being part of the storage system itself. As such, communication between an application instance(s) and system 100 can facilitate an operation, e.g., communication between system 100 and a writer instance can result in write(s) 106, communication between system 100 and a reader instance can result in read(s) 107, etc.

In some embodiments, other access control features can be implemented. In an aspect, another access control feature can correspond to validating access to write an event as distinct from validating access to commit a written event. Typically, where an event is written singly, the write and the commit of the event can occur close in time and permitted access is less likely to change between writing and committing the event to the OES. However, where an OES can employ transactions, e.g., committing multiple events to an OES as a group, access permissions can change between writing of an event of the group and committing of the event as part of committing all the events of the transaction group. As an example, a transaction can comprise events related to commercial air travel, wherein individual events can be written as part of a transaction when a passenger checks baggage, the passenger boards a plane, the plane departs, the plane lands, the baggage is collected, etc. As such, the transaction can occur over many hours in some circumstances. The events can be written to an OES but can remain uncommitted until it is determined that the transaction has successfully completed and all events can be committed to the OES, e.g., where the transaction fails, then none of the events can be committed to the OES. In transactions, access permissions can change over the life of the transaction. Accordingly, system 100, via SACC 120, can perform access control at the writing of each event of a transaction, as is enabled by the instant disclosure hereinabove. However, system 100, again via SACC 120, can further support validating access of all of the written events before permitting the transaction to commit. Where transaction-level access does not satisfy an access rule, e.g., an event does not have permission to be committed to an OES where it has been written, then the committing can be denied. As an example, an event can have been written to a portion of an OES that a writer instance previously had permission to access when writing the event but has since lost permission prior to the event being committed as part of committing a transaction, which can result in prohibiting the committing of all events of the transaction even though the events were properly previously written. In this situation, the transaction can simply fail to commit and the events can eventually be overwritten, etc., or, in some embodiments, a corrective action(s) can be undertaken such that the event data can be written, perhaps re-written, to a portion of the OES that also satisfies the access rule such that the commit of the transaction can be completed and all events of the transaction can be committed to the OES after correction.

Figure 2:
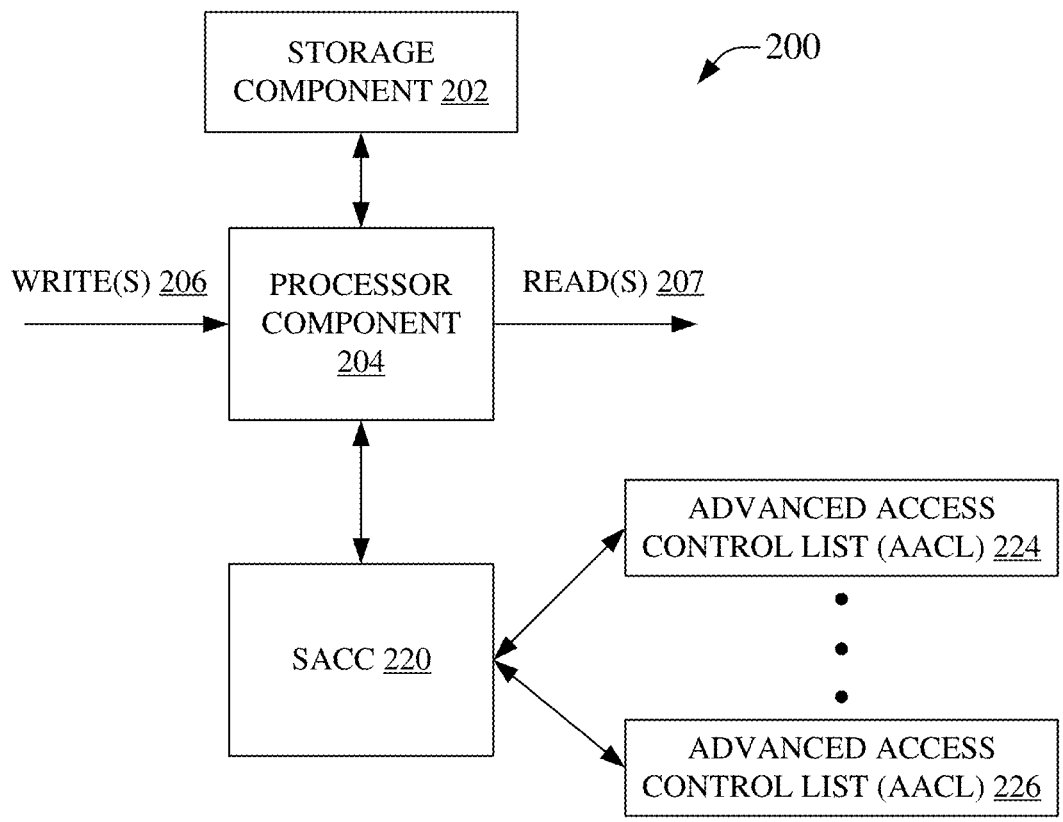
FIG. 2 is an illustration of an example system that can facilitate, via employment of an advanced access control list, access control for an ordered event stream, in accordance with aspects of the subject disclosure.
Figure 2:
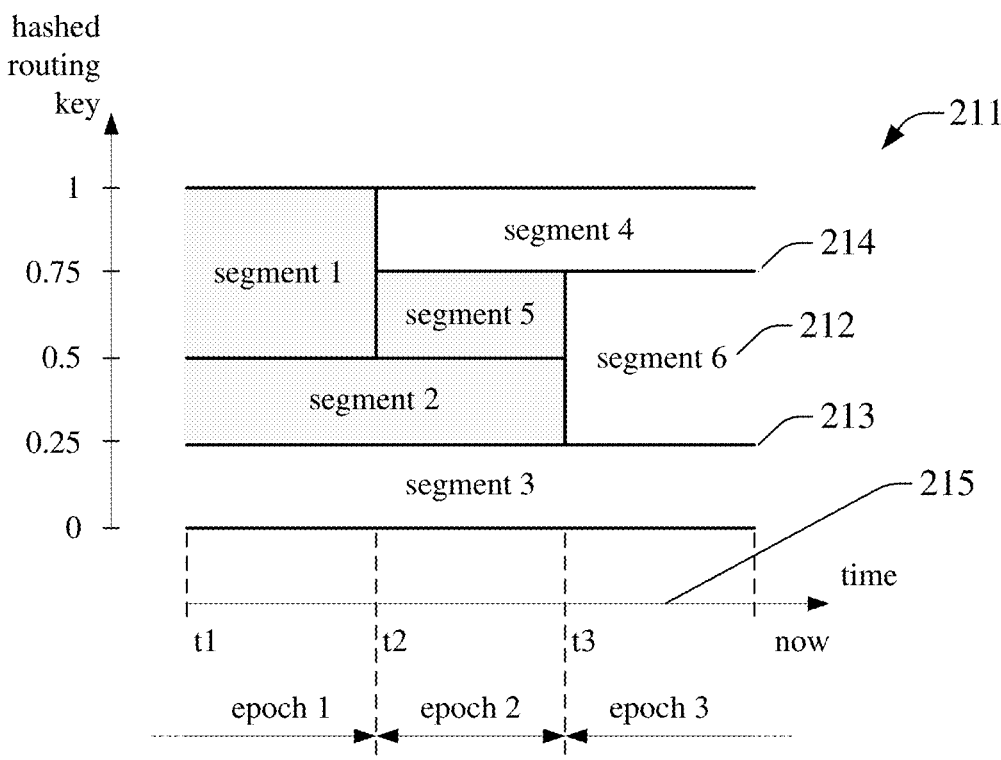

FIG. 2 is an illustration of an example system 200 that can facilitate, via employment of an advanced access control list, access control for an ordered event stream, in accordance with aspects of the subject disclosure. OES storage system 200 can comprise a storage component 202 that can store an OES. An OES can store one or more events. An event can be associated with a key. A key can typically be determined from aspects or characteristics of, or corresponding to, an event. Events can be written into and OES in an ordered manner according to a key. Similarly, events can be read from an OES, generally in an ordered manner, according to a key. A writer instance can provide data for an event, illustrated as write(s) 206, which can be written to a portion of an OES. Similarly, a reader can receive data from an event, illustrated as read(s) 207, wherein the event can be stored at a portion of an OES.

Processor component 204 of a system 200 can receive write(s) 206, e.g., data from writer instances that can be written as events into an OES. Processor component 204 of a system 200 can provide access to the data of events as read(s) 207 that can be communicated to a reader instance. Generally, one processing instance, e.g., processor component 204, etc., can be designated for writing events to a segment of an OES, which can comprise one or more segments, for examples, as illustrated at 211, that can store events according to a key. As previously disclosed, typically the number of processing instances allowed to write to a given segment is limited to one to simplify ordering of written events. However, a given processing instance can read, write, etc., to more than one OES segment. As such, generally, for a given number of segments there can typically be up to an equal number of processing instances.

In an aspect, a key space can comprise keys corresponding to one or more segments of an OES, for example, as illustrated at 211. Segments can therefore act as logical containers associated with a particular range of keys for an event stream and can be used to store events within an OES. When a new event is written to a stream, it can be stored to one of the segments based on the event key. In an aspect, the key space can be divided into a number of ranges that can correspond to the number of segments comprising an OES. As an example, a key space for an OES can be from 0 to 1, such as is illustrated at 211. The example OES at 211 can initially, in epoch 1, comprise three parallel segments, wherein example segment 1 can sequentially store events with keys from 0.5 to 1, segment 2 from 0.25 to >0.5, and segment 3 from 0 to >0.25. In this example, a first event with a key of 0.6 can be appended to the first segment. The key space of an OES can evolve, e.g., through different epochs, to comprise different numbers of OES segments, for example, as is illustrated at 211. The key space can be symmetrically or asymmetrically divided and can be, but is not required to be, contiguous. As an example, in epoch 2 at 211, the OES can comprise four segments, e.g., segments 2, 3, 4, and 5. As a further example, in epoch 3 illustrated in 211, the OES can comprise three segments, e.g., segments 3, 4, and 6. In this example, segment 6 at 212 exists in epoch 3 at 215, but not in epoch 1 or epoch 2. Moreover, segment 6 can store events having a key range from 0.25 to >0.75. As such, even though epoch 3 has the same count of segments as epoch 1, the key space corresponding to the segments is can be different in epoch 3 than in epoch 1.

In system 200, stream access control component (SACC) 220 can facilitate access control for portions of an OES. Access control can facilitate or limit access to a portion of an OES in relation to an application instance performing an operation(s) relative to the portion of the OES, e.g., reading an event from the portion of the OES, writing an event to the portion of the OES, facilitating commission of a transaction to the portion of the OES, etc. In an aspect, an application instance, e.g., a reader, a group of readers, a writer, etc., can be identified via processor component 204. The identified application instance can be associated with one or more keys, e.g., a key, a group of keys, a range of keys, etc. In an aspect, the association between the application instance identity and the one or more keys can be represented in an advanced access control list (AACL), e.g., AACL 224, 226, etc. It is noted that an AACL need not strictly be a list, but can be embodied in any form of data that can represent a relationship between an identifier, e.g., of an application instance, and an OES key space key, for example, a list, a table, a function, a hash, etc., or combinations thereof. An AACL can be employed by SACC 220, processor 204, etc., to determine if the identified application instance can access a portion of an OES. Generally, an event key can be compared to an AACL to determine if access to the corresponding portion of the OES is allowable. As an example, a reader instance can request to read an event with a key of 0.6. The example reader instance can be identified and SACC 220 can receive a corresponding AACL, for example, AACL 224. The key of 0.6 can be compared to AACL 224 to determine if the example reader instance can access the event stored at the key space of 0.6 of the OES, e.g., where an access rule is determined to be satisfied based on AACL 224, and the example event key of 0.6. Moreover, additional information associated with the requested read operation in this example can also be employed. As such, continuing the present example, the read operation can, for example, identify that the read should be for an event in segment 5 of epoch 2 of an OES corresponding to the illustration at 211. Whereas segment 5, in this example, comprises keys of 0.6, where AACL 224 indicates the example reader is permitted access, read(s) 207 can return the event(s) having a key of 0.6 from segment 5 in epoch 2 of the OES corresponding to illustration 211. Similarly, where the example reader instance is associated with being permitted to read into segment 6 of epoch 3 at the key of 0.6, this can similarly be permitted by SACC 220. However, where, for example, the example reader instance only has permission to access segment 5 events but not segment 6 events, e.g., events with keys from 0.5 to >0.75 in epoch 2 only, then read(s) 207 would be prohibited from returning events of segment 6 in epoch 3 even though the example key of 0.6 falls in the range of keys for segment 6. As such, SACC 220 can be understood to be able to determine one or more keys that a particular application instance can be permitted to access, e.g., a key in a segment, group(s) of key(s), range(s) of key(s), etc., and moreover, in some embodiments, access can further be based on the type of operation to be performed, by epoch, by OES, etc.

System 200 can also facilitate offloading certain access control functionality to application instances, or other remotely located devices, systems, etc. In an aspect, SACC 220 can facilitate communicating data corresponding to one or more AACLs, e.g., AACL 224 to 226, etc., outside of system 200 to facilitate other systems, devices, etc., to perform preliminary access screening. As an example, a writer instance can be given a range of keys that it is permitted to access based on the identification of the writer instance in system 200, e.g., SACC 220 can return information to the writer instance from an AACL corresponding to the writer instance identity. The example writer instance can then determine if an data to be written to an event has a key that satisfies an access rule based on the example received AACL information. Where the writer instance determines it is allowed access, it can send the event data to system 200 for writing to the OES. It is noted that system 200 can also check that the writer instance can access the OES based on the data received in relation to the example write request. However, where the writer instance determines that it does not have permission to access the portion of the OES based on the example received AACL information, then the writer instance can avoid sending the request to write the event to system 200. Where no write request is sent, there is no write request for system 200 to check, e.g., the offloading of the preliminary access screening functionality to the example writer instance can reduce the computing burden on system 200. Similar examples are readily appreciated for other application instances, e.g., reader instances, etc., but are not explicitly recited here for the sake of clarity and brevity but are to be considered within the scope of the instant disclosure.

Figure 3:
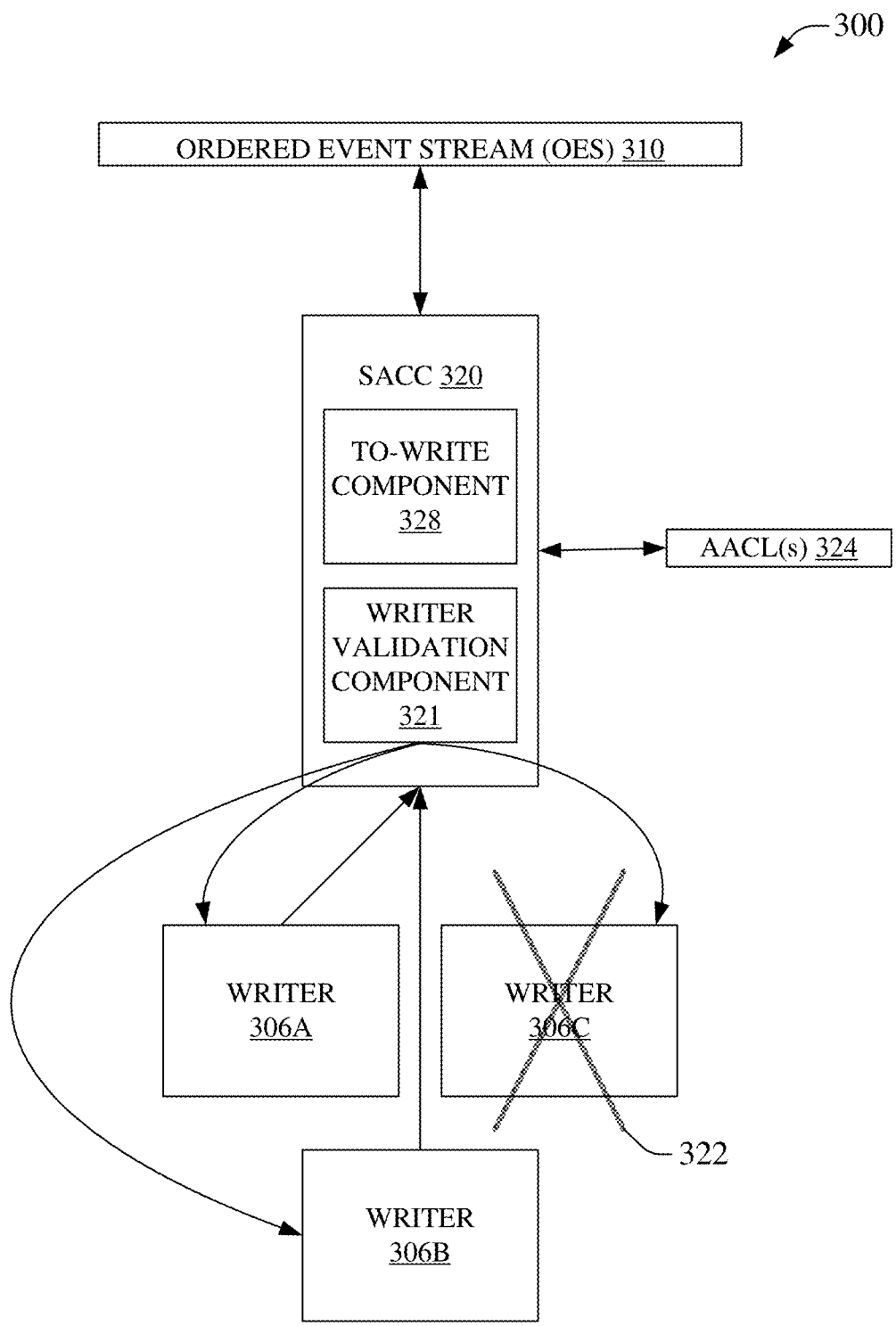
FIG. 3 illustrates an example system that can enable access control corresponding to a write operation into an ordered event stream, in accordance with aspects of the subject disclosure.

FIG. 3 is an illustration of a system 300, which can enable access control corresponding to a write operation into an ordered event stream, in accordance with aspects of the subject disclosure. System 300 can comprise a storage component that can store OES 310 based on operations, e.g., read(s), write(s), etc., processed by a processor component. An OES can store one or more events. An event can be associated with a key. A key can typically be determined from aspects or characteristics of, or corresponding to, an event. Events can be written into and OES in an ordered manner according to a key. Similarly, events can be read from an OES, generally in an ordered manner, according to a key. A writer instance, e.g., writer 306A, 306B, 306C, etc., can provide data for an event that can be written to a portion of an OES. Similarly, a reader can receive data from an event stored at a portion of an OES.

System 300 can comprise SACC 320 can facilitate access control for portions of an OES. Access control can facilitate or limit access to a portion of an OES in relation to an application instance performing an operation(s) relative to the portion of the OES, e.g., reading an event from the portion of the OES, writing an event to the portion of the OES, facilitating commission of a transaction to the portion of the OES, etc. In an aspect, an application instance, e.g., a reader, a group of readers, a writer, etc., can be identified. The identified application instance can be associated with one or more keys, e.g., a key, a group of keys, a range of keys, etc. In an aspect, the association between the application instance identity and the one or more keys can be represented in one or more AACLs, e.g., AACL(s) 324. It is again noted that an AACL need not strictly be a list. AACL(s) 324 can be employed by SACC 320 to determine if the identified application instance can access a portion of an OES. Generally, an event key can be compared to an AACL to determine if access to the corresponding portion of the OES is allowable. As an example, writer 306A can request to write an event with a key of 0.5 to OES 310. Writer 306A can be identified and SACC 320 can receive a corresponding AACL from AACL(s) 324. SACC 320 can then determine if an access rule is satisfied based on the data of the AACL and the key of 0.5. Where an access rule is determined to be satisfied event data received from writer 306A can be permitted to be written into OES 310 at the key of 0.5. As is noted elsewhere herein, additional information associated with the example requested write operation can also be employed, e.g., type of operation, epoch, OES, key, etc.

SACC 320 of system 300 can also facilitate offloading certain access control functionality to application instances, or other remotely located devices, systems, etc. In an aspect, SACC 320 can comprise writer validation component 321, which can facilitate communicating data corresponding to one or more of AACL(s) 324 to facilitate performing preliminary access screening. As an example, writer 306B can be identified in system 300 and SACC 320 can return corresponding AACL data to writer 306B. Where writer 306B determines that data for an event to be written satisfies an access rule based on the returned AACL data, writer 306B can send the event data to system 300 for writing to OES 310. To-write component 328 can then determine if the data for writing to the event satisfies an access rule based on AACL(s) 324 and the identity of writer 306B before permitting the writing of a corresponding event to OES 310. As such, system 300 can illustrate preliminary access screening by writer 306B via AACL data returned by writer validation component 321 based on a determined identity of an application instance, and furthermore, can also illustrate OES system validation of access based on data received to be written to an event and an identity of an application instance via to-write component 328. As another example, writer 306C can prevent communicating data for an event write operation at 322 based on performing a preliminary access screening employing AACL data corresponding to writer 306C as returned by writer validation component 321. Where writer 306C does not send the example event data, use of to-write component 328 is avoided, e.g., where no event write is sent, there is no write for to-write component 328 to check. Offloading of preliminary access screening functionality to writer 306C in this example can reduce the computing burden on system 300. Similar examples can readily appreciated for other application instances, e.g., reader instances, etc., but are not explicitly recited here for the sake of clarity and brevity but are to be considered within the scope of the instant disclosure.

Figure 4:
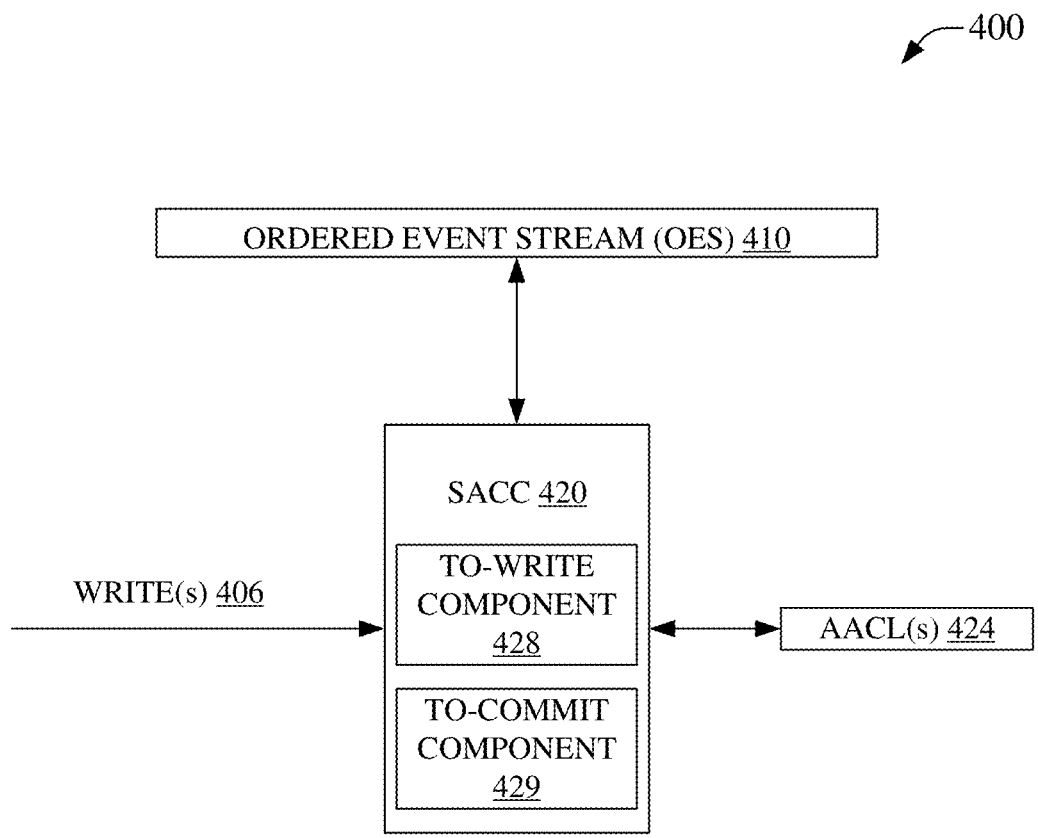
FIG. 4 is an illustration of an example system enabling access control corresponding to a transaction write commit operation of an ordered event stream, in accordance with aspects of the subject disclosure.

FIG. 4 is an illustration of an example system 400 that can facilitate access control corresponding to a transaction write commit operation of an ordered event stream, in accordance with aspects of the subject disclosure. System 400 can comprise a storage component that can store OES 410 based on operations, e.g., read(s), write(s), etc., processed by a processor component. An OES can store one or more events. An event can be associated with a key. A key can typically be determined from aspects or characteristics of, or corresponding to, an event. Events can be written into and OES in an ordered manner according to a key. Similarly, events can be read from an OES, generally in an ordered manner, according to a key. A writer instance can provide data for an event that can be written to a portion of an OES. Similarly, a reader can receive data from an event stored at a portion of an OES.

System 400 can comprise SACC 420 that can facilitate access control for portions of an OES. Access control can facilitate or limit access to a portion of an OES in relation to an application instance performing an operation(s) relative to the portion of the OES, e.g., reading an event from the portion of the OES, writing an event to the portion of the OES, facilitating commission of a transaction to the portion of the OES, etc. In an aspect, an application instance, e.g., a reader, a group of readers, a writer, etc., can be identified. The identified application instance can be associated with one or more keys, e.g., a key, a group of keys, a range of keys, etc. In an aspect, the association between the application instance identity and the one or more keys can be represented in one or more AACLs, e.g., AACL(s) 424. It is yet again noted that an AACL need not strictly be a list. AACL(s) 424 can be employed by SACC 420 to determine if the identified application instance can access a portion of an OES. Generally, an event key, received via write(s) 406, etc., can be compared to an AACL to determine if access to the corresponding portion of the OES is allowable. SACC 420 can determine if an access rule is satisfied based on the data of the AACL and the event key. Where an access rule is determined to be satisfied event data comprised in write(s) 406 can be permitted to be written into OES 410 in accord with the key. As is noted elsewhere herein, additional information associated with the example requested write operation can also be employed, e.g., type of operation, epoch, OES, key, etc.

SACC 420 of system 400 can also facilitate access control of data to be written to an event of a transaction, access control of written data to be committed as part of committing a transaction of events, or combinations thereof. A transaction, as disclosed elsewhere herein, can comprise multiple events that can be individually written but are typically all committed to an OES together or are not committed at all, e.g., the events of the transaction are either committed as a group or none of them are committed. Accordingly, SACC 420 can comprise to-write component 428 that can determine if access is to be allowed when data is received to be written to an event stored on the OES, as has been described at length elsewhere herein, e.g., the identity of a writer can allow a corresponding AACL to be employed to determine if the data of the event can be allowed to be written e.g., by permitting access, based on a key for the event to be written, which can generally be determined from the data to be written to the event or corresponding data relating to a characteristic associated with the event to be written.

SACC 420 can, in some embodiments, comprise to-commit component 429, which can facilitate determining access to an OES in relation to committing events that have already been written to the OES. In an aspect, this can enable allowing, or denying, permission to commit a group of events comprising a transaction. As has previously been discussed, where events of a transaction, for example, can be written to a data store over time, the access permissions can change in that time. As such, an event that can have been written when a writer was granted access at a first time can fail to be given access permission at a later time when the already written event is otherwise ready to be committed to the OES as part of committing a transaction comprising the event. Events can be written to an OES but can remain uncommitted until a later point. Where it is determined that a transaction that the event is comprised in has successfully completed and all events can be ready to be committed to the OES, access permissions can again be checked. In this situation, a transaction can fail to be committed. However, in some embodiments, a corrective action(s) can be undertaken such that the event data can be manipulated, altered, updated, moved, etc., to cure the access control problem and allow the access rule to be satisfied, thereby allowing the transaction to be committed to the OES after correction.

Figure 5:
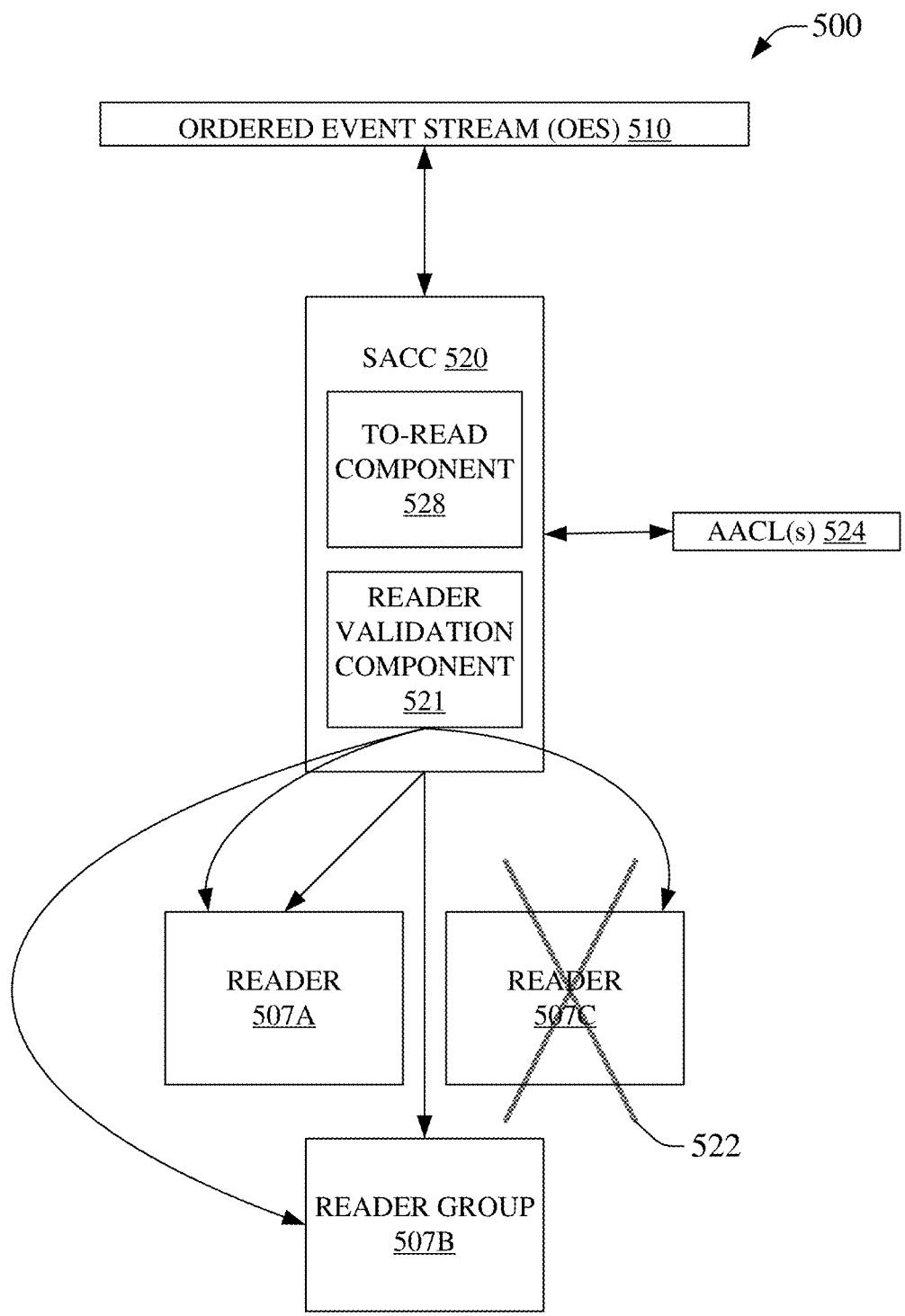
FIG. 5 is an illustration of an example system that can facilitate access control corresponding to a read operation from an ordered event stream, in accordance with aspects of the subject disclosure.

FIG. 5 is an illustration of a system 500 that can facilitate access control corresponding to a read operation from an ordered event stream, in accordance with aspects of the subject disclosure. System 500 can comprise a storage component that can store OES 510 based on operations, e.g., read(s), write(s), etc., processed by a processor component. An OES can store one or more events. An event can be associated with a key. A key can typically be determined from aspects or characteristics of, or corresponding to, an event. Events can be written into and OES in an ordered manner according to a key. Similarly, events can be read from an OES, generally in an ordered manner, according to a key. A reader instance, e.g., reader 507A, 507B, 507C, etc., can receive data for an event that is written to a portion of an OES. Similarly, a writer can provide data for an event to be stored at a portion of an OES.

System 500 can comprise SACC 520 can facilitate access control for portions of an OES. Access control can facilitate or limit access to a portion of an OES in relation to an application instance performing an operation(s) relative to the portion of the OES, e.g., reading an event from the portion of the OES, writing an event to the portion of the OES, facilitating commission of a transaction to the portion of the OES, etc. In an aspect, an application instance, e.g., a reader, a group of readers, a writer, etc., can be identified. The identified application instance can be associated with one or more keys, e.g., a key, a group of keys, a range of keys, etc. In an aspect, the association between the application instance identity and the one or more keys can be represented in one or more AACLs, e.g., AACL(s) 524. As before, it is noted that an AACL need not strictly be a list. AACL(s) 524 can be employed by SACC 520 to determine if the identified application instance can access a portion of an OES. Generally, an event key can be compared to data of an AACL to determine if access to the corresponding portion of the OES is allowable. As an example, reader 507A can request to read data of an event with a key of 0.5 from OES 510. Reader 507A can be identified and SACC 520 can receive a corresponding AACL from AACL(s) 524. SACC 520 can then determine if an access rule is satisfied based on the data of the AACL and the example key of 0.5. Where an access rule is determined to be satisfied reader 507A can be permitted to read event data from OES 510 at the key of 0.5. As has been noted elsewhere herein, additional information associated with the example requested read operation can also be employed, e.g., type of operation, epoch, OES, key, etc.

SACC 520 of system 500 can also facilitate offloading certain access control functionality to application instances, or other remotely located devices, systems, etc. In an aspect, SACC 520 can comprise reader validation component 521, which can facilitate communicating data corresponding to one or more of AACL(s) 524 to facilitate performing preliminary access screening. As an example, reader 507B can be identified in system 500 and SACC 520 can return corresponding AACL data to reader 507B. Where reader 507B determines that a key for an event to be read satisfies an access rule based on the returned AACL data, reader 507B can request the read of the event from system 500. To-read component 528 can then determine if the key for the read satisfies an access rule based on AACL(s) 524 and the identity of reader 507B before permitting access to read the corresponding event from OES 510. As such, system 500 can illustrate preliminary access screening by reader 507B via AACL data returned by reader validation component 521 based on a determined identity of an application instance, and furthermore, can also illustrate OES system validation of access based on a received read operation for an event and an identity of an application instance via to-read component 528. As another example, reader 507C can prevent communicating data for an event read operation at 522 based on performing a preliminary access screening employing AACL data corresponding to reader 507C as returned by reader validation component 521. Where reader 507C determines it should not send the read request, use of to-read component 528 can be avoided, e.g., where no read request is sent, there is no event key to be read and therefore no access to be controlled by to-read component 528. Offloading of preliminary access screening functionality to reader 507C in this example can reduce the computing burden on system 500. Similar examples can readily appreciated for other application instances, e.g., writer instances, etc., but are not explicitly recited at this point for the sake of clarity and brevity, although they are to be considered within the scope of the instant disclosure.

Figure 6:
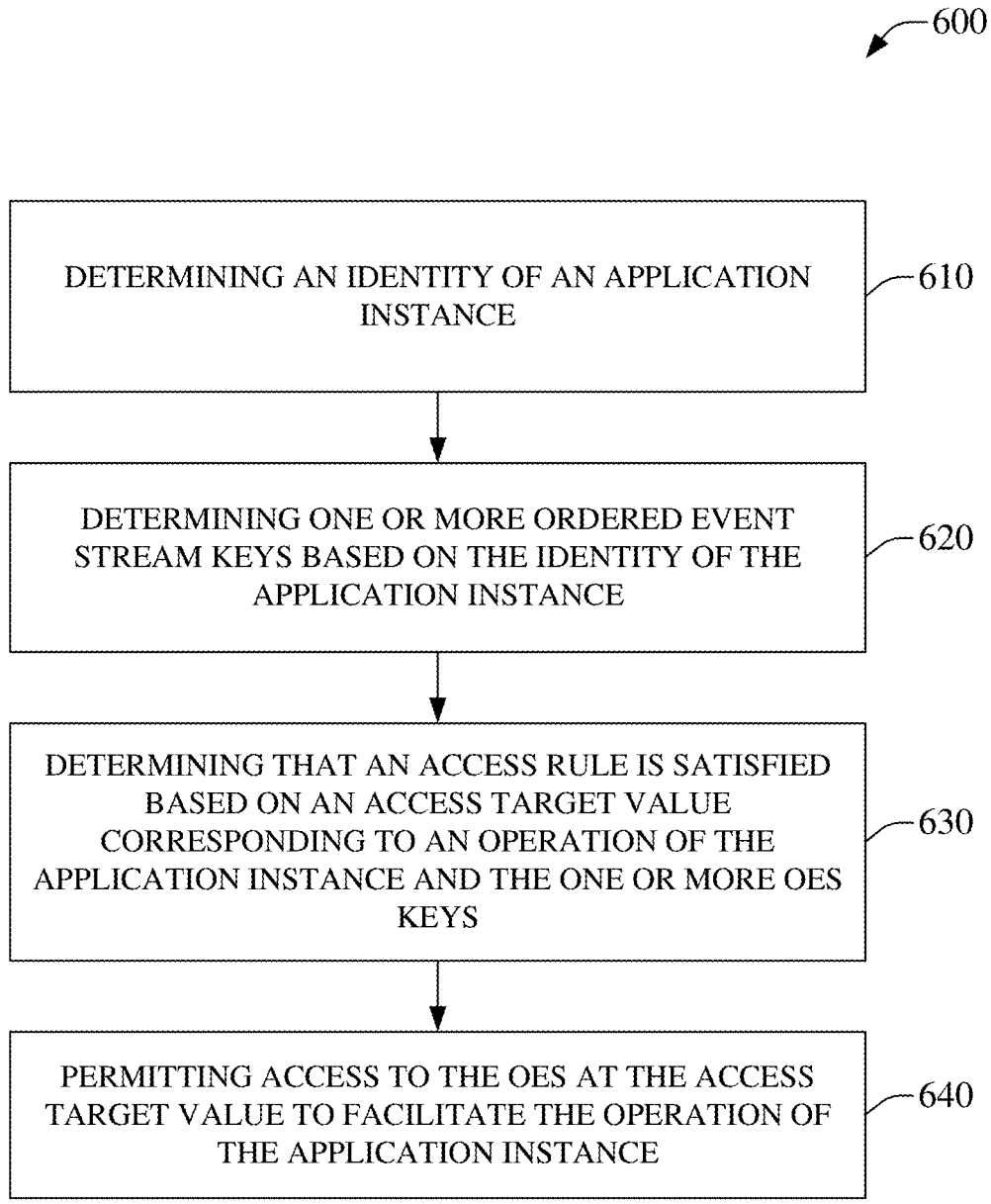
FIG. 6 is an illustration of an example method enabling access control for an ordered event stream, in accordance with aspects of the subject disclosure.
Figure 7:
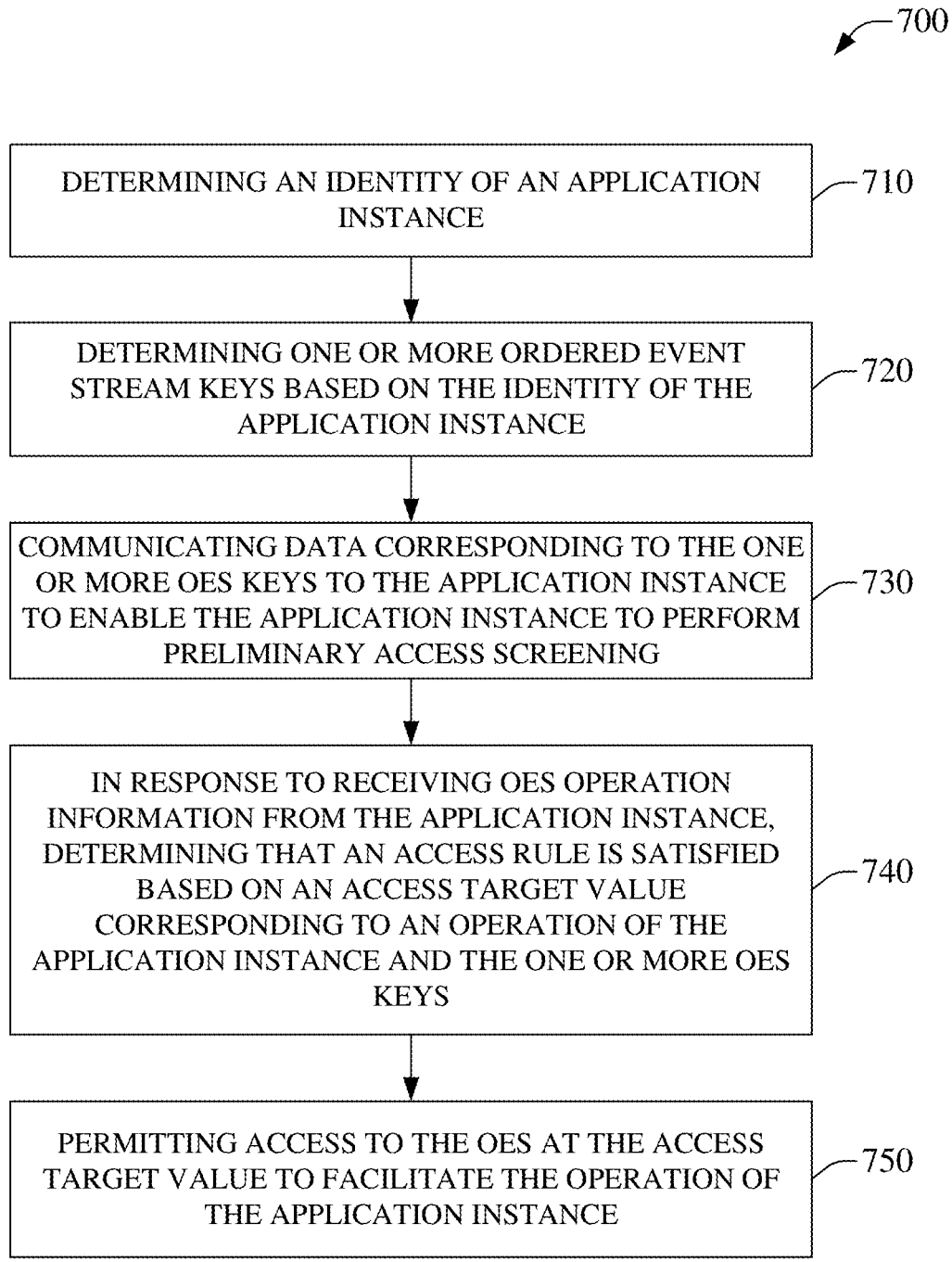
FIG. 7 is an illustration of an example method facilitating preliminary access screening and access control for an ordered event stream, in accordance with aspects of the subject disclosure.
Figure 8:
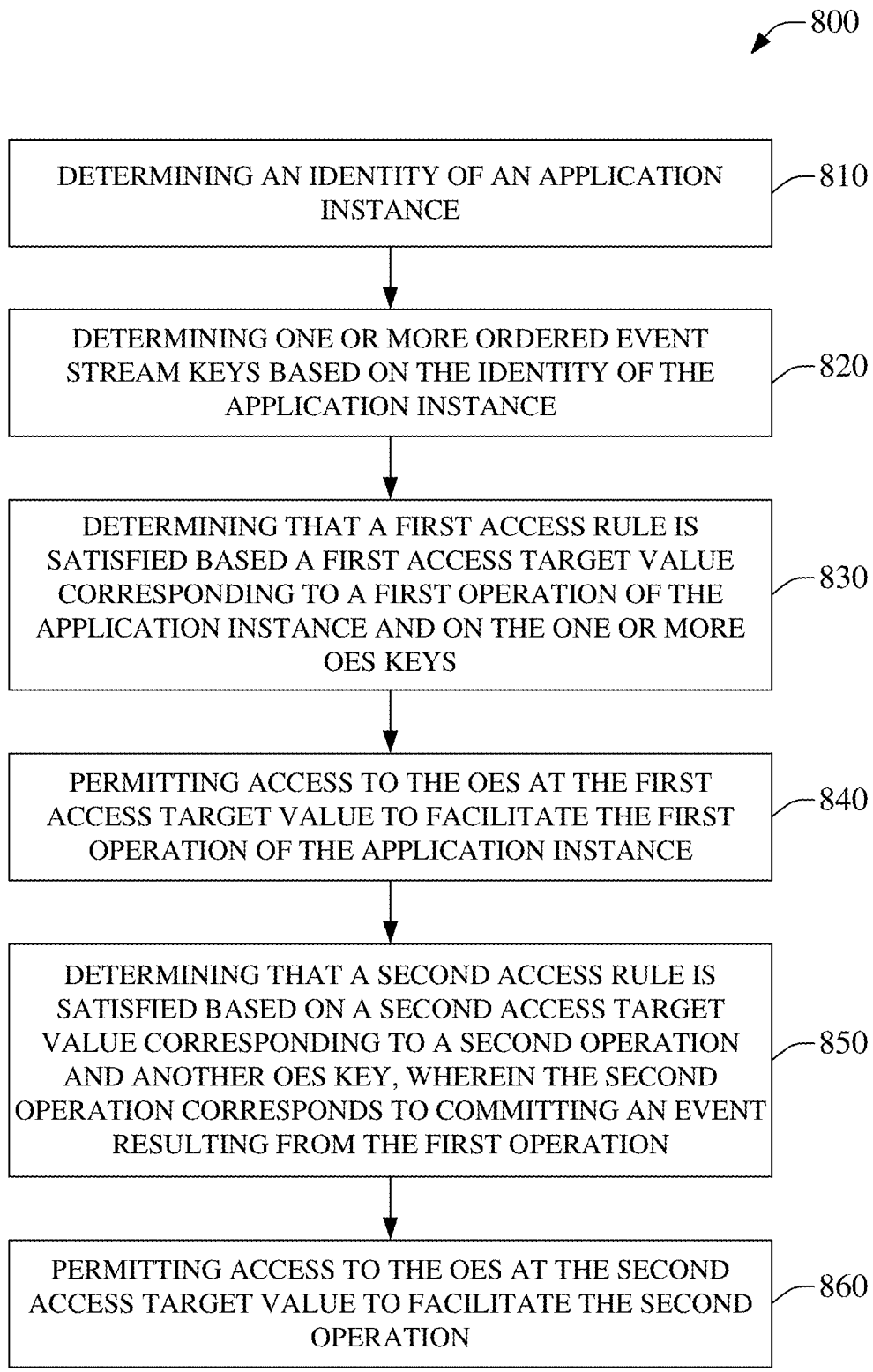
FIG. 8 is an illustration of an example method enabling access control corresponding to committing a transaction to an ordered event stream, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate access control for an ordered event stream, in accordance with aspects of the subject disclosure. At 610, method 600 can comprise determining an identity of an application instance. An application instance, e.g., a writer instance, reader instance, etc., can be associated with a key, keys, range of keys, ranges of keys, etc., that the application instance can be permitted access to in an OES or portion thereof. Rather than simply regulating access by all instances of an application to all of an OES, the instant disclosure can limit access of individual instances of an application to a portion of an OES based on a key value. In an aspect, additional factors can further be associated with permitted access by an application instance, e.g., type of operation, type of event, epoch, OES, OES segment, etc. Data corresponding to access freedom, limitations on access, etc., can be associated with an individual application instance. Moreover, the permissions can be inherited, for example, a reader instance comprised in a group of reader instances can inherit the access permissions corresponding to the group of reader instances, etc. In an example, an application instance can be identified, such as by location, deployment date, serial number, model number, processor id, etc., and access permissions corresponding to the identified application instance can be determined, received, etc., to facilitate determining if the application instance is permitted to access an indicated portion of an OES, e.g., based on an access target value, event key, etc.

As such, method 600, at 620, can comprise determining one or more ordered event stream keys based on the identity of the application instance determined at 610. In an aspect, data relating to access permissions corresponding to the identified application instance can be stored in an advanced access control list (AACL). In some embodiments, an AACL can be a list, while in some embodiments, the AACL can be other than a list, e.g., a table, database, etc. An AACL can indicate individual routing keys, lists of routing keys, routing key ranges, such as via use of a wildcard value in a routing key value, or combinations thereof. One or more AACL can correspond to an identified application instance. Accordingly, at 620, one or more keys can be determined as accessible to the identified application instance. As an example, a reader instance identity can indicate that the corresponding reader can access all events of a first segment of an OES, such that, when the reader instance requests to read an event from the first segment of the OES, this read can be permitted, while where the reader instance requests to read an event of a second segment of the OES, it can be prohibited from such access to the second segment of the OES and the read can fail. Similarly, a writer instance can be allowed or denied permission to write an event to a portion of an OES based on where the event is to be written, e.g., based on the access target value, etc., and on the identity of the writer instance.

At 630, method 600 can comprise determining that an access rule is satisfied. The determining satisfaction of the access rule can be based on an access target value, e.g., where in the key space the application instance wants access to, and the one or more OES keys determined at 620. In an aspect, the access target value an correspond to the operation of the application instance, as an example, a writer operation can indicate where in the key space an event can be written, while in another example, a reader operation can indicate where an event to be read is expected to be in the key space, etc. Generally, the access target value is just referred to as the key of the event to occur at the instigation of the application instance, e.g., the application instance can indicate where it wants to read from, write to, etc., in the OES key space and permitted access this location can be controlled via reference to an AACL or the like.

Method 600, at 640, can permit access to the OES at the access target value to facilitate the operation of the application instance. At this point method 600 can end. Access can be permitted where the access rule is satisfied. Of course, where the access rule is determined to not be satisfied, access can be limited, refused, denied, prohibited, banned, etc., e.g., where an application instance attempts to access a part of an OES that it does not have permission to access, the application instance can be prevented from that access. In some embodiments, this can serve as a security measure and can comprise additional responses, for example banning the application instance permanently, revoking all access permissions, alerting a security application or security personnel, or numerous other security type responses. However, it is of course possible that the errant attempt to access a portion of an OES was not malicious, and more corrective actions can also be undertaken, for example alerting a user that their application instance is attempting to access an unpermitted portion on an OES to allow the user to correct the error, etc. In an aspect, other factors can also be considered in a response to a failure to be permitted access. As an example, where a remote sensor with a writer instance experiences a power surge and begins attempting to write at high frequency, e.g., many writes in a short period, etc., even where the writes are to an permitted portion of an OES, the high frequency can result in limiting the permitted access, such as where the AACL indicates that a key range is accessible to the writer instance up to m times per hour, where the writer attempts to write for the $m^{th}$ time in the hour it can be permitted, but where the writer then attempts to write for the $m+1^{th}$ time, access can be denied, method 600 can alert the writer admin, etc.

FIG. 7 is an illustration of an example method 700, which can facilitate preliminary access screening and access control for an ordered event stream, in accordance with aspects of the subject disclosure. At 710, method 700 can comprise determining an identity of an application instance. An application instance, e.g., a writer instance, reader instance, etc., can be associated with key(s) that the application instance can be permitted access to in an OES segment. As such, data corresponding to access control can be associated with an individual application instance.

At 720, method 700 can comprise determining one or more ordered event stream keys based on the identity of the application instance determined at 710. In an aspect, data relating to access permissions corresponding to the identified application instance can be stored in an AACL that can be a list, table, database, etc. An AACL can indicate individual routing keys, lists of routing keys, routing key ranges, such as via use of a wildcard value in a routing key value, or combinations thereof. One or more AACL can correspond to an identified application instance. Accordingly, at 720, a key of a segment of an OES can be determined to be accessible to the identified application instance.

At 730, method 700 can comprise communicating data corresponding to the one or more OES keys to the application instance. The key data can be employed by the application instance to perform a preliminary access screening for OES operations to be sent to an OES, e.g., as a read operation, a write operation, etc. Preliminary access screening can facilitate an application instance determining if it can expect to have permission to access a target key space location of an OES prior to burdening the OES storage system. In an aspect, the application instance can screen one or more operations based on the communicated key data. Additionally, in some embodiments, the application instance can receive updates to the key data. Where application instances are performing preliminary screening, this can reduce the burden on an OES access control function by requesting that the application instance not send operations that are already determined to not be permitted. It is further noted that in some embodiments, the communication can be to another component corresponding to the application instance, e.g., where an application instance is run in a processor thread, the key data can be sent to another thread of the processor to allow the other thread to perform preliminary access screening on behalf of the application instance. In an aspect, where preliminary access screening results in the application instance sending an operation to the OES storage system, e.g., sending a read operation, a write operation, etc., the OES storage system can separately perform its own access control.

At 740, method 700 can comprise determining that an access rule is satisfied. The determining satisfaction of the access rule can be based on an access target value and one or more OES keys, e.g., such as determined at 720. In an aspect, where the OES keys determined at 720 can have become stale or otherwise out of date, e.g., after a period of time, method 700 at 740 can comprise updating the one or more keys, e.g., accessing an AACL for the identified application instance to receive relevant keys.

At 750, method 700 can permit access to the OES at the access target value to facilitate the operation of the application instance. At this point method 700 can end. Access can be permitted where the access rule is satisfied. Of course, where the access rule is determined to not be satisfied, access can be limited, refused, denied, prohibited, banned, etc.

Method 700 illustrates that an application instance can attempt to send only operations that pass a preliminary access screening. Moreover, where an operation, that purportedly has passed the preliminary access screening at the application instance, can then be subject to further access control as received at the OES storage system. As such, where an application instance is sending operations to the OES, these can be subject to access control even where they may have already passed a preliminary access screening at the application instance. As an example, where an application instance is operating improperly, it can errantly send an operation that may not have passed a preliminary access screening. In this example, the OES storage system can perform access control on the errantly sent operation. Where the example errantly sent operation requests access to a segment of the OES that the application instance does not have permission to access, the OES storage system can deny access, notify an administrator, flag the application instance, etc.

FIG. 8 is an illustration of an example method 800 that can facilitate access control corresponding to committing a transaction to an ordered event stream, in accordance with aspects of the subject disclosure. At 810, method 800 can comprise determining an identity of an application instance. An application instance, e.g., a writer instance, reader instance, etc., can be associated with key(s) that the application instance can be permitted access to in an OES segment. As such, data corresponding to access control can be associated with an individual application instance.

At 820, method 800 can comprise determining one or more OES keys based on the identity of the application instance determined at 810. In an aspect, access control data corresponding to the identified application instance can be stored in an AACL that can be a list, table, database, etc. An AACL can indicate individual routing keys, lists of routing keys, routing key ranges, such as via use of a wildcard value in a routing key value, or combinations thereof. One or more AACL can correspond to an identified application instance. Accordingly, at 820, a key of a segment of an OES can be determined to be accessible to the identified application instance.

At 830, method 800 can comprise determining that a first access rule is satisfied. The determining satisfaction of the first access rule can be based on a first access target value corresponding to a first operation of the application instance and on an OES key(s). This can enable method 800 to determine that access is allowable. As an example, where the application instance is a writer instance, the writer can be determined to be allowed to write an event, e.g., via the first operation, into a portion of the OES, e.g., at the first access target value.

At 840, method 800 can permit access to the OES at the first access target value to facilitate the first operation of the application instance. Access can be permitted where the first access rule is satisfied. Of course, where the first access rule is determined to not be satisfied, access can be limited, refused, denied, prohibited, banned, etc. Up to this point, method 800 can act like other disclosed methods to allow or deny a write operation, etc. However, where, for example, the application instance can write an event that can be part of a transaction that can comprise other writes, the writes of the transaction can be written but remain uncommitted for some time, over which time, access permissions can change. Accordingly, it can be desirable to perform further access control, for example at a time where a transaction is ready to be committed to an OES.

As such, method 800, at 850, can comprise determining that a second access rule is satisfied based on a second access target value that can correspond to a second operation and another OES key(s). In an aspect, the second access target value can be the same value as the first access target value, but in some circumstances can have changed. As an example, the first access target value can be a key of 0.6 in a first epoch of an example OES. In this example, the second access target value can be the same. However, in a version of this example, the second access target value can indicate a key of 0.6 in a second epoch of the example OES, which can be regarded as being different form the first access target value, e.g., relating to different epochs of the OES. In an aspect, the second OES key(s) can be determined by acing an AACL similar to method 800 at 820. This can enable updating of stale or otherwise out of date access control key values. In an aspect, the second operation can be a commit operation, for example, in committing the transaction, the events of the transaction can undergo a commit operation that can be predicated on all events of the transaction being permitted to commit.

At 860, method 800 can permit access to the OES at the second access target value to facilitate the second operation. At this point method 800 can end. Access can be permitted where the second access rule is satisfied. Of course, where the access rule is determined to not be satisfied, access can be limited, refused, denied, prohibited, banned, etc. Moreover, the permitted access of 860 can be part of the commit process of the example transaction, e.g., the commit can be permitted but may only occur where all events of the transaction have permission to be committed. As such, method 800 can be directed to determining if the second operation can be granted permission to access a portion of the OES, e.g., at the second access target value, but does not dictate how/if this permitted access is used, for example, other OES system(s) can determine if all events of a OES transaction have permitted access to be committed before actually committing the events comprising the OES transaction.

Figure 9:
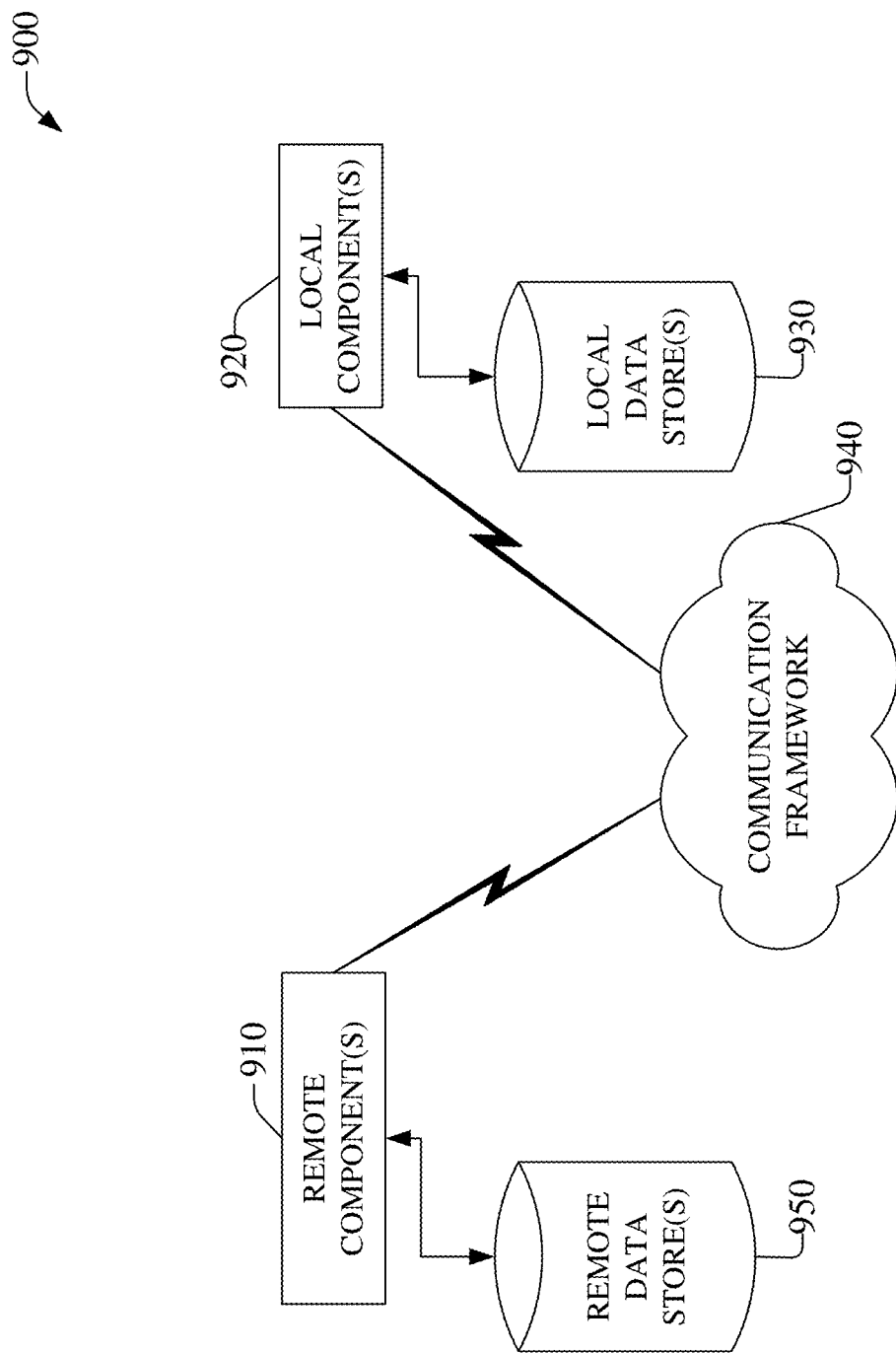
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, 202, etc., a remotely located processor device comprised in processor component 104, 204, etc., a remotely located device comprised in SACC 120, 220, 320, 420, 520, etc., a remotely located reader instance, writer instance, other application instance, or combination thereof, an AACL storage/access device, etc., connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, 202, etc., a local processor device comprised in processor component 104, 204, etc., a local device comprised in SACC 120, 220, 320, 420, 520, etc., an AACL storage/access device, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, writing to, reading from, erasing, access control to, etc., segments of an OES(s) in systems 100, 200, 300, 400, 500, etc., can be communicated via communication framework 940 among storage components of an OES storage network 100, 200, 300, 400, 500, etc., e.g., to facilitate reading, writing, adapting, altering, modifying, erasing, deleting, freeing, etc., events stored via one or more OES(s), as disclosed herein.

Figure 10:
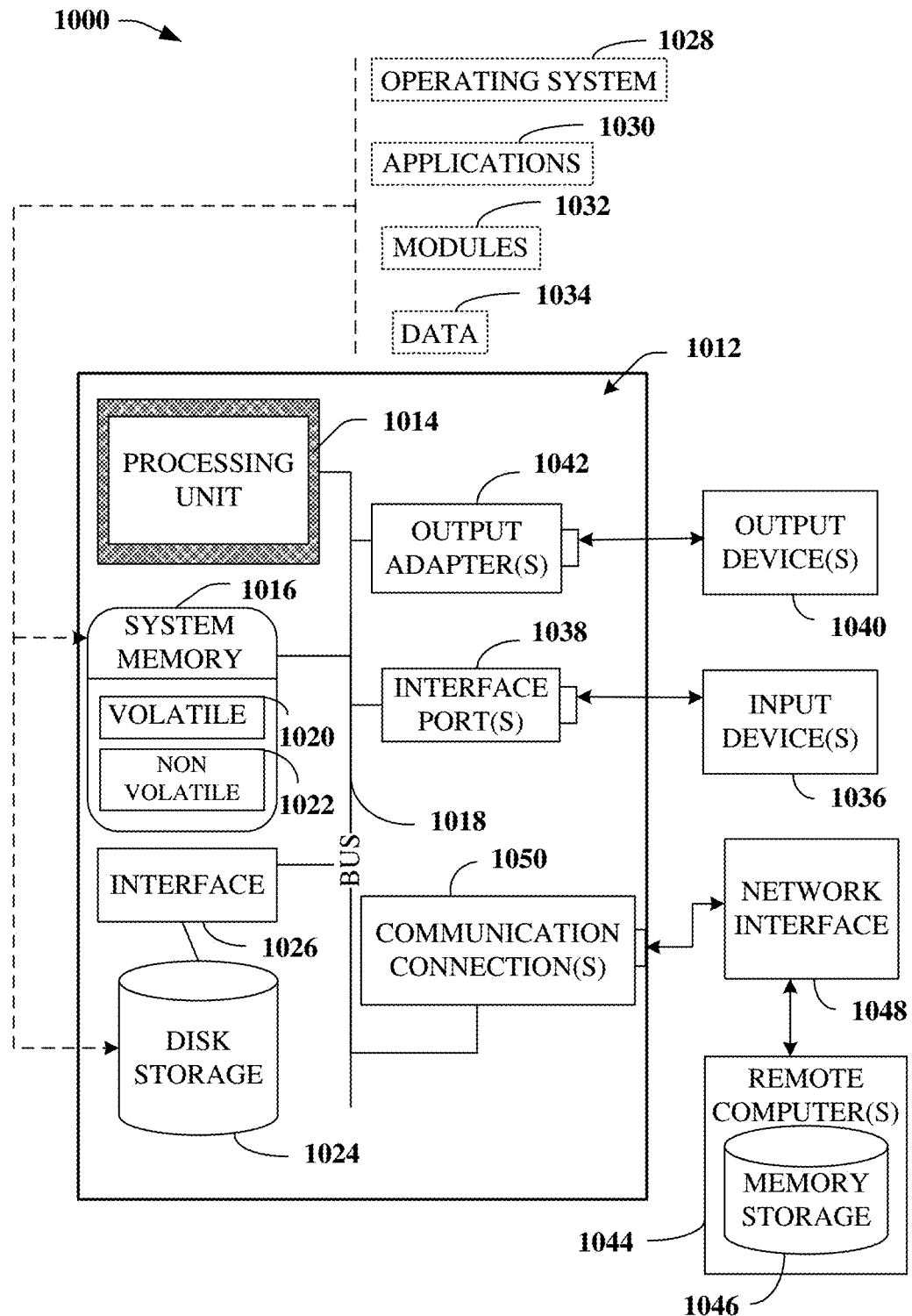
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, 202, etc., processor component 104, 204, etc., SACC 120, 220, 320, 420, 520, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising determining an OES key corresponding to an identity of an application instance, determining that an access rule is satisfied based on an access target value and the ordered event stream key, and permitting access to an ordered event stream in according to the access target value to facilitate performing an operation being attempted by the application instance.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is generally intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that a combination of embodiments of the disclosed subject matter was not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining an identity of an application instance;
determining an ordered event stream key corresponding to the identity of the application instance, wherein the ordered event stream key is stored in an advanced access control list;
determining that an access rule relating to ordered event stream access control is satisfied based on an access target value and on the ordered event stream key, wherein the access target value corresponds to an ordered event stream operation being attempted by the application instance; and
permitting access to an ordered event stream according to the access target value, wherein the permitting the access facilitates performing the operation being attempted by the application instance.

2. The system of claim 1, wherein the application instance is a writer instance and the operation being attempted by the application instance is a write operation.

3. The system of claim 1, wherein the application instance is a reader instance and the operation being attempted by the application instance is a read operation.

4. The system of claim 3, wherein the reader instance is comprised in a reader group.

5. The system of claim 1, wherein the operations further comprise: communicating, to the application instance, screening data corresponding to the ordered event stream key, wherein the screening data facilitates the application instance performing preliminary access screening.

6. The system of claim 1, wherein the determining the ordered event stream key is based on access control data stored in the advanced access control list corresponding to the identity of the application instance.

7. The system of claim 6, wherein the advanced access control list is embodied in a data structure selected from a group of data structures comprising a list, a table, a database, an ordered event stream event, and a blockchain block.

8. The system of claim 1, wherein the determining the ordered event stream key comprises determining more than one ordered event stream key.

9. The system of claim 8, wherein the determining more than one ordered event comprises determining a contiguous range of ordered event stream keys.

10. The system of claim 8, wherein the determining more than one ordered event comprises determining a non-contiguous range of ordered event stream keys.

11. The system of claim 8, wherein the determining more than one ordered event comprises use of a wildcard operator.

12. A method, comprising:
determining, by a system comprising a processor, an ordered event stream key corresponding to an identity of an application instance, wherein the ordered event stream key is stored in an advanced access control list; and
in response to determining, by the system, that an access rule relating to ordered event stream access control is satisfied based on an access target value that corresponds to an ordered event stream operation being attempted by the application instance and further based on the ordered event stream key, permitting access to an ordered event stream in accord with the access target value, wherein the permitting the access facilitates performing the operation being attempted by the application instance.

13. The method of claim 12, wherein the application instance is a writer instance and the operation being attempted by the application instance is a write operation.

14. The method of claim 12, wherein the application instance is a reader instance and the operation being attempted by the application instance is a read operation.

15. The method of claim 12, wherein the determining the ordered event stream key comprises determining a range of ordered event stream keys comprising the ordered event stream key.

16. The method of claim 12, further comprising:
communicating, by the system and to the application instance, screening data corresponding to the ordered event stream key to facilitate the application instance performing a preliminary access screening operation; and
receiving the ordered event stream operation being attempted by the application instance after the ordered event stream operation has been subjected to the preliminary access screening and before the determining that the access rule is satisfied.

17. A non-transitory machine-readable medium,
comprising executable instructions that, when executed by a processor, facilitate performance of operations, comprising:
identifying an application instance, resulting in an identity of the application instance;
determining an ordered event stream key based on the identity of the application instance, wherein the ordered event stream key is stored in an advanced access control list; and
permitting access to an ordered event stream according to an access target value, wherein the access target value corresponds to an ordered event stream operation being attempted by the application instance, wherein the permitting the access facilitates performance of the operation being attempted, and wherein the permitting the access is based on determining that an access rule relating to ordered event stream access control is satisfied based on the access target value and the ordered event stream key.

18. The non-transitory machine-readable medium of claim 17, wherein the application instance is a writer instance and the operation being attempted by the application instance is a write operation.

19. The non-transitory machine-readable medium of claim 17, wherein the application instance is a reader instance and the operation being attempted by the application instance is a read operation.

20. The non-transitory machine-readable medium of claim 17, wherein the operations further comprise communicating, to the application instance, screening data corresponding to the ordered event stream key, wherein the screening data facilitates the application instance performing preliminary access screening.

* * * * *